(12) United States Patent
Tsurumi et al.

(10) Patent No.: US 10,508,911 B2
(45) Date of Patent: Dec. 17, 2019

(54) APPARATUS AND METHOD FOR MEASUREMENT, AND PROGRAM

(71) Applicant: Sony Corporation, Tokyo (JP)

(72) Inventors: Shingo Tsurumi, Saitama (JP); Masashi Eshima, Chiba (JP); Takaaki Kato, Tokyo (JP); Tatsuki Kashitani, Tokyo (JP); Akihiko Kaino, Kanagawa (JP); Masaki Fukuchi, Tokyo (JP); Takuto Motoyama, Kanagawa (JP); Suguru Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/762,120

(22) PCT Filed: Sep. 15, 2016

(86) PCT No.: PCT/JP2016/077225
§ 371 (c)(1),
(2) Date: Mar. 22, 2018

(87) PCT Pub. No.: WO2017/057016
PCT Pub. Date: Apr. 6, 2017

(65) Prior Publication Data
US 2018/0274915 A1 Sep. 27, 2018

(30) Foreign Application Priority Data
Sep. 29, 2015 (JP) .................. 2015-190832

(51) Int. Cl.
*G06T 1/00* (2006.01)
*G06T 7/55* (2017.01)
(Continued)

(52) U.S. Cl.
CPC ............... *G01C 3/08* (2013.01); *G01C 11/02* (2013.01); *G01C 11/30* (2013.01);
(Continued)

(58) Field of Classification Search
CPC ............... G06T 2207/20221; H04N 5/23296
See application file for complete search history.

(56) References Cited

U.S. PATENT DOCUMENTS 6,222,906 B1 * 4/2001 Sakaguchi ............... A61B 6/06
257/E27.132
9,503,703 B1 * 11/2016 Ramaswamy ....... H04N 13/246
(Continued)

FOREIGN PATENT DOCUMENTS

| EP | 1 816 465 A1 | 8/2007 |
| JP | 62-134516 A | 6/1987 |

(Continued)

OTHER PUBLICATIONS

International Search Report and English translation thereof dated Dec. 6, 2016 in connection with International Application No. PCT/JP2016/077225.
(Continued)

*Primary Examiner* — Paulos M Natnael
(74) *Attorney, Agent, or Firm* — Wolf, Greenfield & Sacks, P.C.

(57) ABSTRACT

The present technique relates to an apparatus and a method for measurement, and a program each of which enables distance estimation to be more simply carried out with higher accuracy.
A three-dimensional measurement apparatus has a rotation control portion controlling rotation of a photographing portion by a rotation mechanism in such a way that the photographing portion is rotated with a center of rotation as an axis in a state in which a distance from the center of rotation of the rotation mechanism portion to a focal point position of the photographing portion is a constant distance; and a distance calculating portion calculating a distance to an object on a space on the basis of a plurality of photographed images obtained through photographing in posi-
(Continued)

tions different from one another by the photographing portion in a state in which the photographing portion is rotated.

10 Claims, 11 Drawing Sheets

(51) Int. Cl.
    *G01C 11/02*     (2006.01)
    *G01C 11/30*     (2006.01)
    *G01C 21/36*     (2006.01)
    *G01C 3/08*     (2006.01)
    *H04N 5/225*     (2006.01)
    *H04N 5/232*     (2006.01)
    *B60Q 9/00*     (2006.01)
    *B60R 1/00*     (2006.01)

(52) U.S. Cl.
    CPC ............ *G01C 21/3602* (2013.01); *G06T 1/00* (2013.01); *G06T 7/55* (2017.01); *H04N 5/225* (2013.01); *H04N 5/23296* (2013.01); *B60Q 9/00* (2013.01); *B60R 1/00* (2013.01); *B60R 2300/8093* (2013.01); *G06T 2207/20221* (2013.01); *G06T 2207/30252* (2013.01)

(56) References Cited

U.S. PATENT DOCUMENTS

| | | | |
|---|---|---|---|
| 9,609,305 B1* | 3/2017 | Ramaswamy | H04N 13/246 |
| 9,866,820 B1* | 1/2018 | Agrawal | G06K 9/00281 |
| 2006/0093046 A1* | 5/2006 | Nakamura | H03M 13/235 |
| | | | 375/242 |
| 2007/0177137 A1 | 8/2007 | Kamada | |
| 2011/0243452 A1 | 10/2011 | Sakaguchi et al. | |
| 2013/0100286 A1* | 4/2013 | Lao | G06K 9/00785 |
| | | | 348/148 |
| 2013/0306615 A1* | 11/2013 | Rozbicki | G02F 1/153 |
| | | | 219/219 |
| 2014/0248045 A1* | 9/2014 | Wada | G03B 17/561 |
| | | | 396/427 |
| 2016/0080637 A1* | 3/2016 | Tasaki | H04N 17/002 |
| | | | 348/36 |
| 2016/0090044 A1* | 3/2016 | Watanabe | B60R 1/12 |
| | | | 348/148 |
| 2017/0116758 A1 | 4/2017 | Grewe et al. | |
| 2017/0366802 A1* | 12/2017 | Hirasawa | G03B 17/12 |
| 2018/0286056 A1 | 10/2018 | Kaino et al. | |
| 2018/0288401 A1 | 10/2018 | Eshima et al. | |
| 2018/0300898 A1 | 10/2018 | Eshima et al. | |

FOREIGN PATENT DOCUMENTS

| | | |
|---|---|---|
| JP | 2000-283719 A | 10/2000 |
| JP | 2003-262510 A | 9/2003 |
| JP | 2007-205926 A | 8/2007 |
| JP | 2007-322368 A | 12/2007 |
| WO | WO 2016/004947 A2 | 1/2016 |

OTHER PUBLICATIONS

Written Opinion and English translation thereof dated Dec. 6, 2016 in connection with International Application No. PCT/JP2016/077225.

International Preliminary Report on Patentability and English translation thereof dated Apr. 12, 2018 in connection with International Application No. PCT/JP2016/077225.

Extended European Seach Report dated Apr. 29, 2019 in connection with European Application No. 16851190.5.

* cited by examiner

APPARATUS AND METHOD FOR MEASUREMENT, AND PROGRAM

CROSS REFERENCE TO RELATED APPLICATIONS

This application is a National Stage of International Application No. PCT/JP2016/077225, filed in the Japanese Patent Office as a Receiving Office on Sep. 15, 2016, which claims priority to Japanese Patent Application No. JP 2015-190832, filed in the Japanese Patent Office on Sep. 29, 2015, each of which is hereby incorporated by reference in its entirety.

TECHNICAL FIELD

The present technique relates to an apparatus and a method for measurement, and a program, and more particularly to an apparatus and a method for measurement, and a program each of which enables distance estimation to be carried out more simply and with high accuracy.

BACKGROUND ART

Heretofore, a three-dimensional measurement technique for measuring a distance to an object has been known. A technique for photographing images in rotational positions while a camera is rotated with a predetermined axis as a center, extracting corresponding feature points from the images photographed in these positions, and measuring a distance on a space from these feature points, for example, has been proposed as such a technique (for example, refer to patent literature 1).

CITATION LIST

Patent Literature

[PTL 1]
JP 2000-283719A

SUMMARY

Technical Problem

However, with the technique described above, it was difficult to measure a distance to an object simply and with high accuracy.

For example, with the technique for measuring the distance from each of the images while the camera is rotated, the feature points must be detected from the photographed images, the coordinates of the directions of rotation of the camera must be retrieved with respect to the feature points, and a matrix arithmetic operation must be carried out. Thus, many arithmetic operations for the distance measurement were required.

The present technique has been made in the light of such a situation, and aims at enabling distance estimation to be carried out more simply and with high accuracy.

Solution to Problem

A measurement apparatus of an aspect of the present technique is provided with a rotation control portion, and a distance calculating portion. The rotation control portion controls rotation of a photographing portion by a rotation mechanism in such a way that the photographing portion is rotated with a rotation center as an axis in a state in which a distance from the rotation center of the rotation mechanism to a focal point position of the photographing portion is a constant distance. The distance calculating portion calculates a distance to an object on a space on the basis of a plurality of photographed images obtained through the photographing in positions different from one another by the photographing portion in a state in which the photographing portion is rotated.

The distance calculating portion can be made to calculate the distance to the object on the basis of a geometric relationship among corresponding points in the plurality of photographed images.

The distance calculating portion can be made to extract line images constituted by pixel line containing the corresponding points from the photographed images. In addition, the distance calculating portion can be made to calculate the distance to the object on the basis of a synthetic image obtained by arranging side by side the plurality of line images obtained from the plurality of photographed images, and synthesizing the plurality of line images.

The distance calculating portion can be made to calculate the distance to the object on the basis of amplitude of a locus of the corresponding points in the synthetic image.

The measurement apparatus is further provided with a rectification portion for rectifying the photographed images, and the distance calculating portion can be made to calculate the distance to the object on the basis of the rectified image obtained through the rectification.

The rotation control portion can be made to control the rotation of the photographing portion provided in an upper portion of a vehicle.

The photographing portion can be constituted by a two-dimensional image sensor.

The photographing portion can be constituted by a line sensor.

The rotation control portion can be made to control the rotation of the photographing portion in such a way that the photographing portion makes one rotation at a constant speed.

A measurement method or a program of an aspect of the present technique includes the steps of: controlling rotation of a photographing portion by a rotation mechanism in such a way that the photographing portion is rotated with a rotation center as an axis in a state in which a distance from the rotation center of the rotation mechanism to a focal point position of the photographing portion is a constant distance; and calculating a distance to an object on a space on the basis of a plurality of photographed images obtained through photographing in positions different from one another by the photographing portion in a state in which the photographing portion is rotated.

In the aspect of the present technique, the rotation of the photographing portion by the rotation mechanism is controlled in such a way that the photographing portion is rotated with the rotation center as the axis in the state in which the distance from the rotation center of the rotation mechanism to the focal point position of the photographing portion is the constant distance. In addition, the distance to the object on the space is calculated on the basis of the plurality of photographed images obtained through the photographing in the positions different from one another by the photographing portion in the state in which the photographing portion is rotated.

Advantageous Effect of Invention

According to the aspect of the present technique, the distance estimation can be carried out more simply and with high accuracy.

It should be noted that the effect described here is by no means necessarily limited, and any of the effects described in the present disclosure may also be offered.

DESCRIPTION OF EMBODIMENTS

Hereinafter, an embodiment to which the present technique is applied will be described with reference to the drawings.

First Embodiment

With Regard to Outline of the Present Technique

The present technique relates to a system for photographing images in respective positions while a photographing portion is moved along a predetermined locus, and estimating a three-dimensional distance to an object on a space on the basis of a synthetic image produced by accumulating line images containing corresponding portions of the resulting images.

The present technique can be applied to a vehicle itself such as a passenger car, a measurement system with which a vehicle is equipped, various kinds of electric apparatuses such as a wearable device which a user wears, a manned or unmanned flying object, or the like. In the following, a description will be continuously given with respect to a case where a vehicle is equipped with a three-dimensional measurement apparatus to which the present technique is applied as an example.

Figure 1:
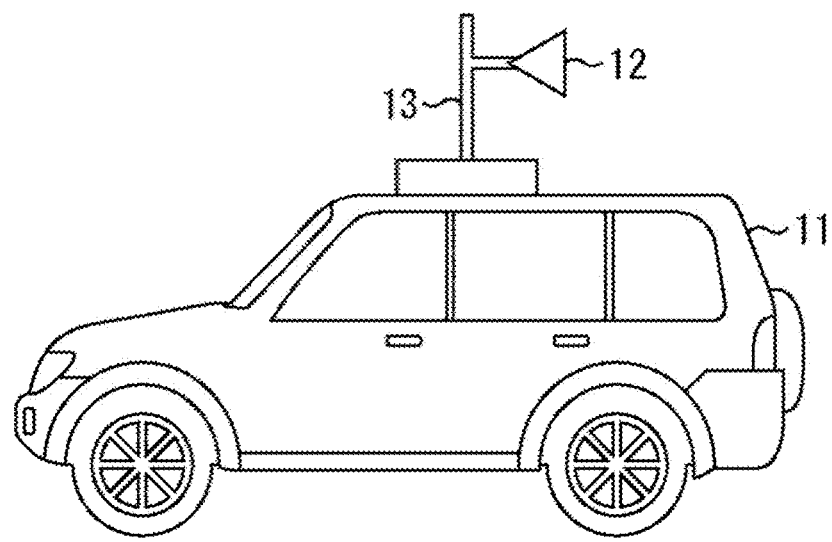
FIG. 1 is a view depicting an example of application of the present technique.

In the case where the vehicle is equipped with the three-dimensional measurement apparatus to which the present technique is applied, for example, as depicted in FIG. 1, a photographing portion 12 is mounted to a vehicle 11 which is equipped with the three-dimensional measurement apparatus, thereby carrying out omnidirectional photographing.

Specifically, the photographing portion 12 constituted by a camera or the like including an image sensor or the like is mounted to a shaft 13 fixed to an upper portion of the vehicle 11. In addition, a plurality of images to be photographed are continuously photographed in different directions, in a state in which the photographing portion 12 is rotated with the shaft 13 as an axis of rotation. Then, distances to respective subjects (objects) existing in the circumstances of the vehicle 11 are obtained by calculation from the photographing portion 12 in the real space, that is, the vehicle 11 on the basis of a plurality of photographed images.

With the three-dimensional measurement apparatus, a plurality of images to be photographed having a fine parallax are thus continuously photographed while the photographing portion 12 provided in an upper portion of the vehicle 11 is rotated. As a result, the distances to the objects in the circumstances can be measured with high accuracy.

For example, in the three-dimensional measurement apparatus, a depth map exhibiting the distances (depths) to the objects when viewed from the vehicle 11 is produced with respect to every direction on the basis of a result of the measurement of the distances to the objects. If such a depth map is used, then, the environment of the circumstances of the vehicle 11, such as a situation of arrangement of the objects in every direction can be accurately grasped. As a result, for example, the safety at the time of traveling of the vehicle 11 can be improved.

It should be noted that the production of the depth map, in a word, the measurement of the distances to the objects in the circumstances may be not only carried out at the time of the traveling of the vehicle 11, but also carried out at the time of stop of the traveling of the vehicle 11.

Figure 2:
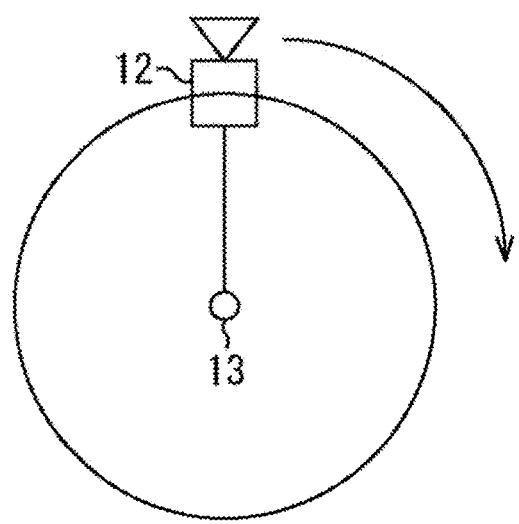
FIG. 2 is a view explaining rotation drive of a photographing portion.
Figure 3:
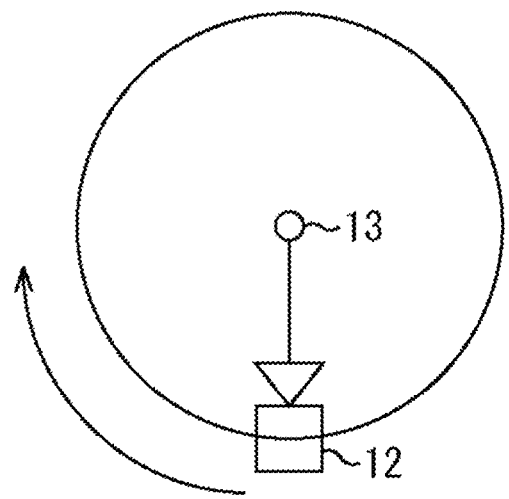
FIG. 3 is a view explaining rotary drive of the photographing portion.

Here, any of methods such as the methods, for example, depicted in FIG. 2 and FIG. 3 may be adopted as the method of rotating the photographing portion 12. By the way, portions in FIG. 2 and FIG. 3 corresponding to those in FIG. 1 are assigned the same reference numerals, and a description thereof is suitably omitted here.

In an example depicted in FIG. 2, the photographing portion 12 is rotated so as to move on a circle having a predetermined radius with a shaft 13 as an axis of rotation (rotation center), and photographs a direction to the outside when viewed from a center of the circle. In a word, the photographing portion 12 is fixed to the shaft 13 so as to be directed in the direction to the outside of the circle as a locus thereof at the time of the rotation.

In particular, the photographing portion 12 is mounted to the shaft 13 in such a way that the focal point position of the photographing portion 12 and the position of the shaft 13 becomes different positions with each other, in a word, the focal point position of the photographing portion 12 becomes a position which is at a given distance away from the position of the shaft 13 so that the photographing portion 12 is able to obtain the photographed images mutually having the parallaxes at the time of the photographing. The focal point position of the photographing portion 12 is offset at the given distance from the position of the shaft 13, whereby the photographed images obtained through the photographing in the respective rotational positions of the photographing portion 12 become the images mutually having the parallaxes.

In addition, for example, in an example depicted in FIG. 3, the shaft 13 is rotated so as to move on a circle having a predetermined radius with the shaft 13 as the axis of the rotation, and photographs the central direction of the circle. In a word, the photographing portion 12 is fixed to the shaft 13 so as to be directed to the internal direction of the circle as the locus thereof at the time of the rotation.

In the example as well, the photographing portion 12 is mounted to the shaft 13 in such a way that the focal point position of the photographing portion 12 is located in the position which is at the given distance away from the position of the shaft 13. Thus, the photographing portion 12 can photograph every direction of the vehicle 11.

Figure 4:
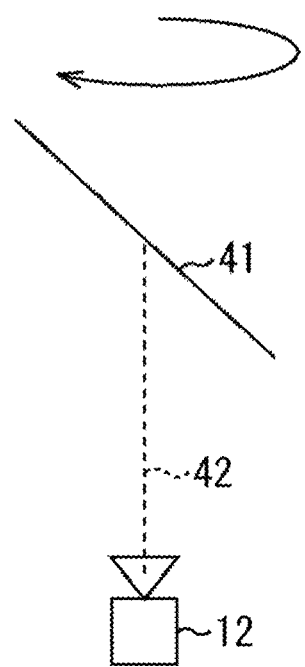
FIG. 4 is a view explaining a rotary drive of a mirror.

Moreover, for example, as depicted in FIG. 4, a mirror 41 as a reflecting member for guiding the light from the circumstances of the vehicle 11 to the photographing portion 12 may be provided, and the mirror 41 may be rotated. Note that, portions in FIG. 4 corresponding to those in FIG. 1 are assigned the same reference numerals, and a description thereof is suitably omitted.

In the example, the mirror 41 is disposed in such a way that a reflecting surface (front surface) of the mirror 41 makes an angle of 45 degrees with an optical axis 42 of the photographing portion 12. Thus, the mirror 41 is rotated with the optical axis 42 as the rotational axis. When the mirror 41 is rotated in such a way, a virtual image of the photographing portion 12 is rotated with respect to the rotational axis with a position of an intersection point between the optical axis 42 and the mirror 41 as a center. Thus, if the photographing portion 12 carries out the photographing while the mirror 41 is rotated, then, the similar photographed image group as that in the case depicted in FIG. 3 can be obtained.

By the way, in this case, the example in which a plurality of photographed images mutually having the parallaxes are photographed by the photographing portion 12, in a word, the example in which a plurality of photographed images obtained through the photographing in the mutually different directions are obtained has been described. Alternatively, however, a plurality of photographing portions 12 may be mounted to the shaft 13, thereby obtaining a plurality of photographed images. In this case, a plurality of photographing portions 12 may be rotated, or when there are a sufficient number of photographing portions 12, the images to be photographed may be photographed without rotating a plurality of photographing portions 12. In addition, for the purpose of reducing an influence by the weather resulting in the exposure of the photographing portion 12 to the rain, a protection against the rain may be mounted to the shaft 13.

Next, a concrete example of producing the depth map from a plurality of photographed images will be described. In the following, a description is continuously given by giving, as an example, the case where as depicted in FIG. 2, the photographing is carried out in a state in which the photographing portion 12 is directed to the outside of the shaft 13.

Figure 5:
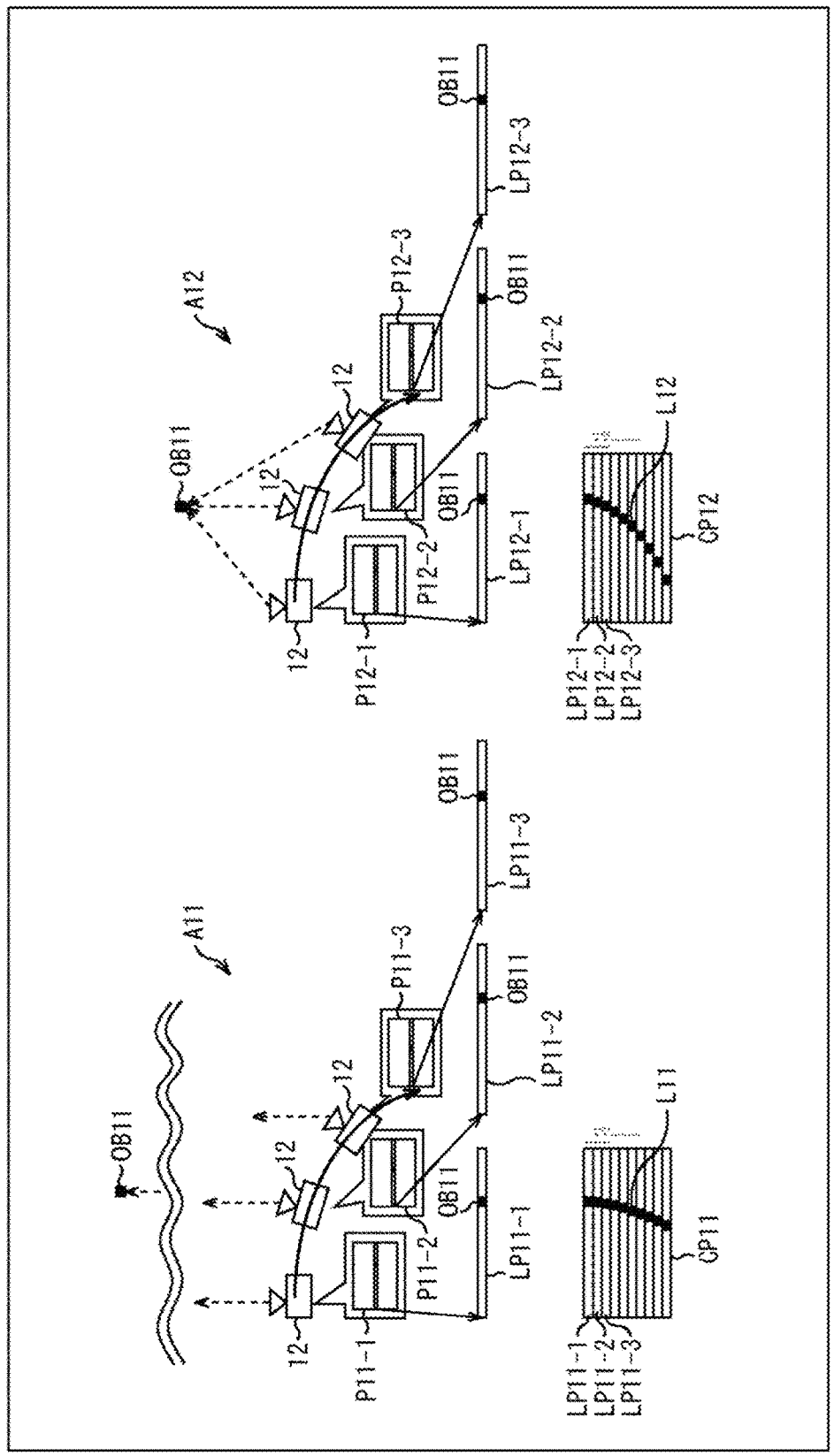
FIG. 5 is a view explaining distance estimation.

For example, as depicted in FIG. 5, it is assumed that an object OB11 is present in the circumstance of the vehicle 11, and the photographed image containing the object OB11 as a subject is obtained through the photographing by the photographing portion 12.

Here, it is assumed that, for example, as indicated by an arrow A11, a distance from the vehicle 11, in a word, the photographing portion 12 to the object OB11 is relatively long, in a word, the object OB11 lies in a long distance.

In such a case, it is assumed that the photographing is carried out while the photographing portion 12 is rotated, and as a result, for example, a photographed image P11-1 to a photographed image P11-3 are obtained at respective times from a time t to a time t+2, and photographed images are also obtained at other times. It should be noted that hereinafter, when the photographed image P11-1 to the photographed image P11-3 do not need to be especially distinguished from one another, they will also be referred to as simply the photographed images P11.

In this example, the object OB11 is contained as the subject in each of the photographed image P11-1 to the photographed image P11-3, and a position of the object OB11 on each of these photographed images P11 is changed in response to the position of the photographing portion 12 at the time of the photographing. In particular, in this case, since the distance from the photographing portion 12 to the object OB11 is far in some measure, an amount of movement of the object OB11 on each of the photographed images P11 with respect to the rotational movement of the photographing portion 12 is relatively less.

When the photographing is carried out in each of the rotational positions while the photographing portion 12 is rotationally moved, and a plurality of photographed images containing the photographed images P11 are obtained, the three-dimensional measurement apparatus extracts line images containing the object OB11 from these photographed images. The line images are images constituted by pixel lines including a plurality of pixels arranged in one direction side by side, the pixels including pixels corresponding to the object OB11, in a word, the pixels on which the object OB11 is caught as the subject.

In this example, for example, each of the line images LP11-1 to LP11-3 is extracted from each of the photographed images P11-1 to P11-3, and the pixels of the corresponding object OB11, in a word, the corresponding points are contained in these line images.

Hereinafter, when the line image LP11-1 to the line image LP11-3 do not need to be distinguished from one another, those will be referred to as simply the line images LP11. In addition, in the following description, other photographed images different from the photographed images P11-1 to P11-3 will also be referred to as simply the photographed images P11. Likewise, other line images different from the line images LP11-1 to LP11-3 will also be referred to as simply the line images LP11.

In addition, in this case, for brief of the description, a description will be given with respect to the case where the object OB11 is located on the plane of rotation of the photographing portion 12, that is, the case where the pixels of a light receiving surface of the photographing portion 12, the pixels corresponding to the object OB11, are located on the plane containing the circle as the locus of the photographing portion 12 on the space when the photographing portion 12 is rotated. In addition, in this case, it is assumed that the pixel line (line) in the horizontal direction of the light receiving surface of the photographing portion 12 lies on the plane of rotation of the photographing portion 12.

In this case, it is only necessary to extract the pixel line constituted by the pixels arranged side by side in the horizontal direction, the pixel line containing the object OB11, in the photographed images P11 in the form of the line pixels LP11. The reason for this is because an epipolar line on the photographed images P11 about the object OB11 becomes parallel to the pixel line in the horizontal direction of the photographed images P11.

The three-dimensional measurement apparatus arranges in the vertical direction the line images LP11 obtained from the photographed images P11 side by side in order of the photographing of them, and synthesizes them, thereby producing one synthetic image CP11. In this case, the line image LP11-1 at a time t is disposed on the uppermost side in the figure, and the line images LP11 at times at and after the time t are accumulated downward in order of the old photographing time, thereby obtaining one synthetic image CP11.

By the way, in this case, a description will be given with respect to an example in which each of the line images LP11 constituting the synthetic image CP11 is the image including the pixel line for one line. However, the line image LP11 may be the images including two or more pixel lines which are arranged adjacent to one another in the vertical direction. This also applies to the line images constituting a synthetic image CP12 which will be described later.

Since the synthetic image CP11 thus obtained contains the object OB11, at each of the times, contained as the subject, the synthetic image CP11 can be said as an image depicting the locus of the object OB11. In this example, on the synthetic image CP11, one curve line L11 is formed by areas of the object OB11 of the line images LP11.

At the time of the photographing of the photographed images P11 with the object OB11 as the subject, the photographing portion 12 makes a rotational movement, in a word, a circular motion. For this reason, the locus of the object OB11 including the areas of the object OB11 at the times on the synthetic image CP11, that is, the curve line L11 becomes a part of a tangent curve. In a word, a part of the tangent curve including the areas of the object OB11 is observed in the synthetic image CP11.

The position of the object OB11 on the photographed image P11 is determined depending on a positional relationship between the photographing portion 12 and the object OB11 on the real space. Therefore, the locus of the object OB11 on the synthetic image CP11 is changed in response to the positional relationship between the photographing portion 12 and the object OB11 at each of the times.

In particular, an amount of movement, in the horizontal direction, of the object OB11 on the photographed images P11 with respect to an amount of rotational movement of the photographing portion 12 is changed in response to the distance from the photographing portion 12 to the object OB11. In other words, the amplitude of the tangent curve including the area of the object OB11 on the synthetic image CP11 is changed in response to the distance from the photographing portion 12 to the object OB11.

For example, it is assumed that as compared with the example indicated by an arrow A11, as indicated by an arrow A12, a distance from the vehicle 11, in a word, the photographing portion 12 to the object OB11 is relatively short, in a word, the object OB11 lies in a near distance.

It is assumed that in such a case, the photographing is carried out while the photographing portion 12 is rotated, and as a result, for example, a photographed image P12-1 to the photographed image P12-3 are obtained at the respective times from the time t to the time t+2 and the photographed images are obtained at other times. By the way, in the following description, when the photographed image P12-1 to the photographed image P12-3 or the photographed images at other times do not need to be especially distinguished from one another, they will be referred to as simply the photographed images P12 as well.

In this example, the object OB11 is contained as the subject in each of the photographed images P12. It is assumed that the three-dimensional measurement apparatus extracts the line image containing the object OB11 from each of the photographed images P12 to obtain a plurality of line images containing the line image LP12-1 to the line image LP12-3, and synthesizes these line images, thereby producing a synthetic image CP12.

By the way, in the following description, when the line images containing the line image LP12-1 to the line image LP12-3 do not need to be especially distinguished from one another, they will be referred to as simply the line images LP12.

The synthetic image CP12 obtained in such a way, similarly to the case of the synthetic image CP11, becomes the image depicting a locus of the object OB11. Thus, one curve line L12 is formed by the areas of the object OB11 of the line images LP12. In the synthetic image CP12, the curved line L12 including the areas of the object OB11 becomes a part of the tangent curve.

In this example, the distance from the photographing portion 12 to the object OB11 is shorter than that in the case of the synthetic image CP11. Therefore, an amount of movement, in the horizontal direction, of the object OB11 on the photographed images P12 with respect to an amount of rotational movement of the photographing portion 12 is also large. For this reason, the amplitude of the tangent curve including the areas of the object OB11 in the synthetic image CP12 becomes smaller than that in the case of the synthetic image CP11.

In such a way, the amplitude of the tangent curve exhibiting the locus of the object OB11 is changed in response to the distance from the photographing portion 12 to the object OB11. Therefore, the three-dimensional measurement apparatus calculates the distance from the photographing portion 12 (vehicle 11) to the object OB11 on the basis of the amplitude of the tangent curve on the synthetic image. Calculating the distance based on the amplitude of the tangent curve can be said as calculating the distance from the geometrical relationship about the same object on each of the photographed images, in a word, the geometrical relationship among the corresponding points which are common to one another.

Figure 6:
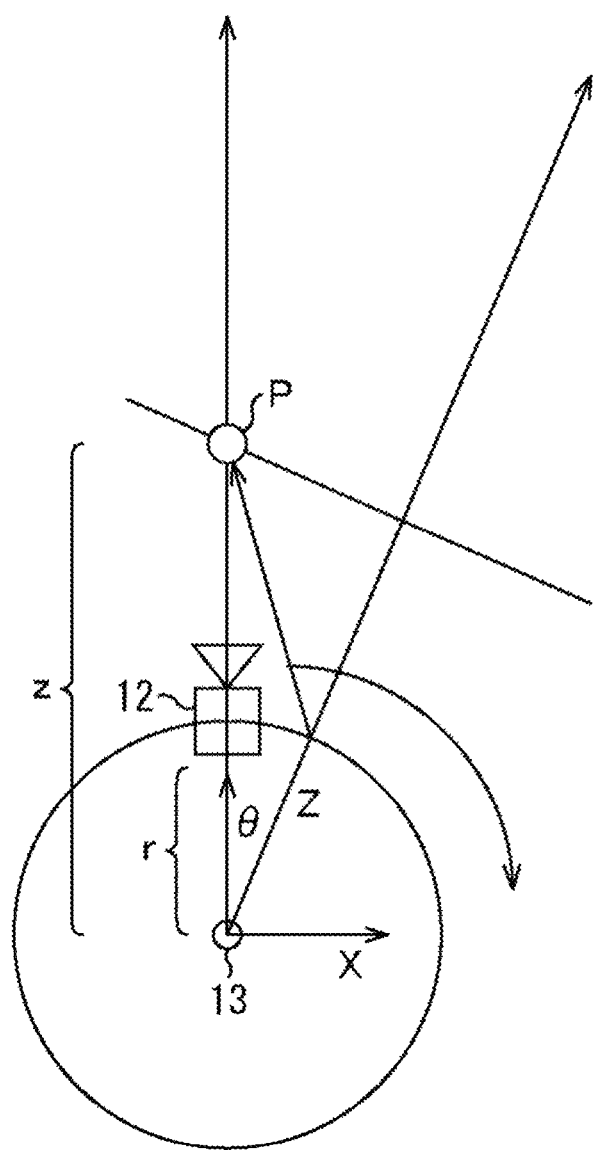
FIG. 6 is a view explaining the distance estimation.

Here, a description will be given with respect to an example of a concrete method of calculating the distance from the geometrical relationship among the corresponding points which are common to one another on each of the photographed images with reference to FIG. 6. By the way, in FIG. 6, portions corresponding to those in the case of FIG. 2 are assigned the same reference numerals, and a description thereof is suitably omitted here.

For example, it is assumed that the object OB11 which has been described with reference to FIG. 5 is located in a position P depicted in FIG. 6, and under this condition, let us consider that a distance z from the shaft 13 to the position P is obtained.

It is now assumed that in the XYZ coordinate system as the three-dimensional orthogonal coordinate system, the shaft 13 is set as the origin, a direction from the shaft 13 toward the position P, in a word, a direction of an optical axis of the photographing portion 12 is set as the Z-direction, a direction vertical to the Z-direction on the plane of rotation of the photographing portion 12 is set as an X-direction, and a direction vertical to each of the X-direction and the Z-direction is set as a Y-direction. Under this condition, the coordinates of the position P in the XYZ coordinate system shall be expressed in the form of (0, 0, z).

In addition, the distance from the shaft 13 to the photographing portion 12 is assigned r, the focal length of the photographing portion 12 is assigned f, and the angle of rotation of the photographing portion 12 is assigned θ. Here, with regard to the angle θ of rotation, in FIG. 6, a clockwise direction is set as a posture direction. Moreover, the coordinates exhibiting the position, in the horizontal direction, of the object OB11 on the synthetic image is assigned u. In this case, in the synthetic image CP11 depicted in FIG. 5, and the synthetic image CP12 depicted in FIG. 5, the transverse direction is assigned the horizontal direction, especially, in FIG. 5, the right direction is assigned the positive direction of the coordinate u.

In such a case, with regard to the Z-coordinate of the position P, that is, the distance z to the position P, a relationship of following Expression (1) is established.

[Expression 1]

$$z \times \cos\theta - r : f = z \times \sin\theta : u \quad (1)$$

Therefore, a relationship of following Expression (2) is obtained from Expression (1).

[Expression 2]

$$u = \frac{z \times \sin\theta}{z \times \cos\theta - r} \times f \quad (2)$$

Here, the distance r and the focal length f in Expression (2) are known, the angle θ of rotation can be obtained at the time of the photographing of the photographed images, and the coordinate u can be obtained from the synthetic image. In addition, since for producing the synthetic image, a plurality of images to be photographed are photographed, a pair of coordinate u and angle θ of rotation at each of the times is obtained. That is to say, a plurality of pairs of coordinates u and angles θ of rotation are obtained.

For this reason, if the plurality of pairs of coordinates u and angles θ of rotation are used, then, the distance z meeting following Expression (3) can be obtained from a least-square method.

[Expression 3]

$$z = \frac{r \times u}{u \times \cos\theta - f \times \sin\theta} \quad (3)$$

As described above, the distance z from the shaft 13 to the object OB11 can be obtained from the least-square method on the basis of the synthetic image. It should be noted that since the distance r from the shaft 13 to the photographing portion 12 is known, the distance from the photographing portion 12 to the object OB11 can be obtained from the distance r and the distance z thus obtained.

Referring back to the description of FIG. 5, for example, the three-dimensional measurement apparatus sets the distance to the object OB11 obtained from the calculation as the depth exhibiting the pixel values of the pixels of the depth map depicting the same positional relationship as that of the pixels of the object OB11 in the photographed images P11, in a word, the distance to the object.

With regard to all the pixels on the photographed images P11, the three-dimensional measurement apparatus successively calculates the distance to the object caught on these pixels to produce the depth map in such a way. In addition, the three-dimensional measurement apparatus produces the depth map every photographed image obtained by photographing in each of the directions, thereby obtaining the omnidirectional depth map.

Figure 7:
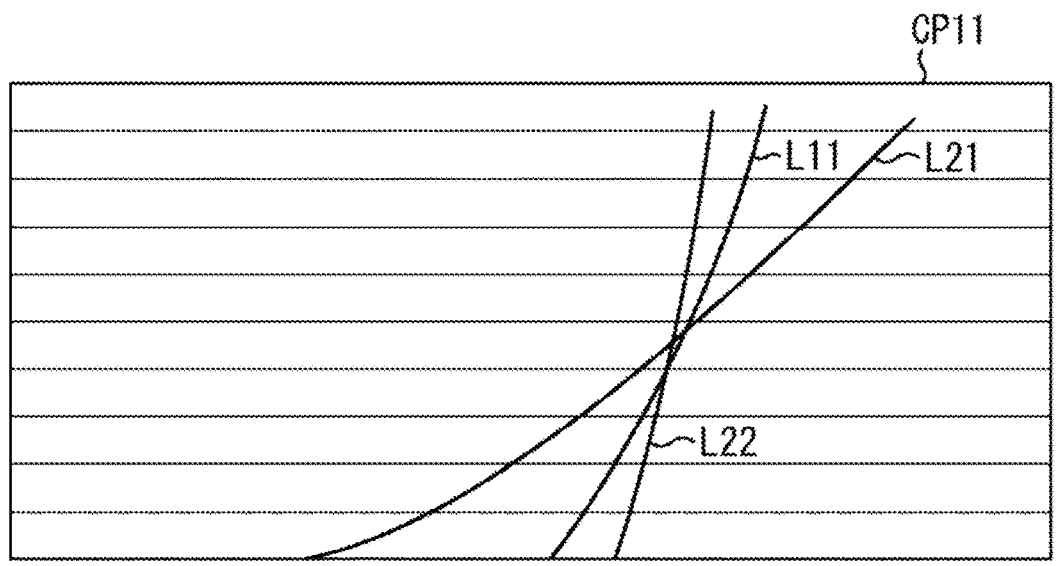
FIG. 7 is a diagram explaining a synthetic image.

Therefore, more specifically, for example, as depicted in FIG. 7, not only a curved line L11 including the areas of the object OB11, but also a plurality of curved lines, including the areas of the subjects (objects) on the line images LP11, such as a curved line L21 and the curved line L22 are contained in the synthetic image CP11. By the way, in FIG. 7, portions corresponding to those in the case of FIG. 5 are assigned the same reference numerals, and a description thereof is suitably omitted here.

The curved line L21 and the curved line L22 which are observed on the synthetic image CP11 are parts of the tangent curves similarly to those of the curved line L11. However, the amplitude of these tangent curves is of various amplitude in response to the distance to the object.

In addition, in the foregoing, the description has been given with respect to the example in which the pixel line corresponding to the plane of rotation of the photographing portion 12 in the photographed images is processed. However, in the case where the pixel line other than that pixel line is processed, it is only necessary that the pixel line including the pixels on the epipolar line in the photographed images at the respective times is extracted to be made the line image. In detecting the epipolar line on each of the photographed images, it is only necessary that, for example, the corresponding points among the photographed images are detected by using a plurality of photographed images to estimate the position and the posture of the photographing portion 12, and so forth, and thus the position and the posture are estimated in accordance with an arbitrary algorithm, the position and the posture on the space of the photographing portion 12 are acquired from the outside, and so forth.

However, since the processing becomes complicated if the epipolar line is obtained with respect to the photographed images at the respective times, rectification of the photographed images may be carried out. In addition, if the depth map corresponding to all the photographed images photographed is produced, then, an amount of processing becomes larger. Therefore, some directions each becoming a reference may be made the reference directions, and the depth map may be produced only with respect to these reference directions.

Figure 8:
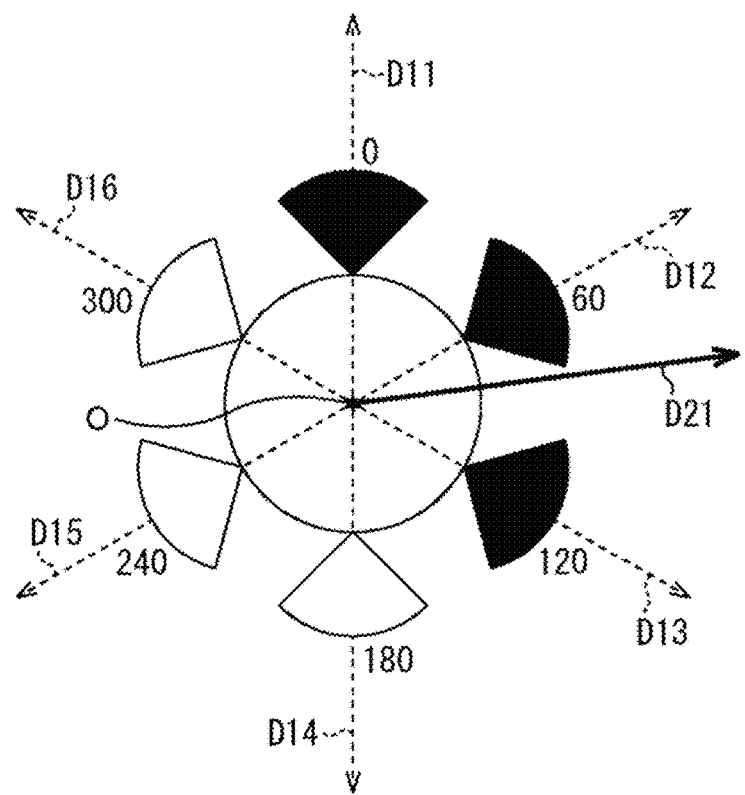
FIG. 8 is a view explaining the distance estimation.

In such a case, for example, as depicted in FIG. 8, it is only necessary that the depth maps are produced only with respect to these respective reference directions with a direction D11 to a direction D16 which are set at regular intervals when viewed from a center O of rotation of the photographing portion 12 as the reference directions. In this case as well, by suitably selecting the reference directions, the depth map group covering every direction of the photographing portion 12 (vehicle 11) can be obtained.

In the example depicted in FIG. 8, in the figure, a direction D11 indicated by an upward arrow is set as 0 degree direction. In addition, total six directions of angular directions D12 to D16 making angles of 60, 120, 180, 240, and 300 degrees with the direction D11 are set as the reference directions.

At the time of measurement of the distances to the respective objects, in a word, at the time of the production of the depth maps, as described above, the images to be photographed in the respective directions are photographed in a state in which the photographing portion 12 is being rotated.

Then, the respective photographed images obtained through the photographing are rectified. For example, paying attention to one photographed image, for one or a plurality of photographed images, in all the reference directions, in which the same object as that in the one photographed image is contained, the photographed images to which attention is paid are rectified. By the way, in the following description, the image which is obtained by rectifying the photographed images will be especially referred to as the rectified image as well.

Specifically, for example, attention shall be paid to the direction D21 that is different from any of the reference directions and that is the direction of the optical axis (photographing direction) of the photographing portion 12 at the time T. Then, the photographed image which is obtained by photographing the direction D21 will be referred to as the photographed image PT.

The three-dimensional measurement apparatus calculates the direction of the optical axis of the photographing portion 12 at the time T, in a word, the direction D21 by using a rotary encoder or the like which is mounted to the shaft 13 for rotating the photographing portion 12. Then, the three-dimensional measurement apparatus rectifies the photographed image PT for N reference directions closest to the direction D21. The number N of reference directions, for example, is determined for a field angle of the photographing portion 12 in advance.

For example, it is assumed that the reference directions are decided at the intervals of 60 degrees like this example, and a horizontal field angle of the photographing portion 12 is 90 degrees. In such a case, the photographed image PT overlaps in field angle the photographed images in the three reference directions: the direction D11 to the direction D13. In a word, since the same object is contained in these photographed images, the photographed images of the three reference directions: the direction D11 to the direction D13 are rectified.

Specifically, there are carried out the rectification of the photographed image PT for the photographed image(s) in the direction D11, the rectification of the photographed image PT for the photographed image(s) in the direction D12, and the rectification of the photographed image PT for the photographed image(s) in the direction D13. As a result, for example, by the rectification for the photographed image(s) in the direction D11, the rotational displacement or the like with the optical axis at the time of the photographing of the photographed image PT as the axis of rotation is corrected. Thus, the subjects which are arranged side by side in the horizontal direction on the photographed images in the direction D11 can be obtained as the rectified images which are similarly arranged side by side in the horizontal direction. In a word, for the subjects in the photographed image PT, the images for which the correction is carried out in such a way that the images are arranged side by side in the same direction as the direction in which these subjects on the photographed image(s) in the direction D11 are arranged side by side are obtained in the form of the rectified images.

When the rectified images are produced with respect to the respective photographed images obtained through the photographing, the three-dimensional measurement apparatus executes the processing described with reference to FIG. 5 and FIG. 6 every reference direction by using these rectified images and the photographed images in the respective reference directions, and produces the depth map corresponding to these photographed images in the reference directions. It should be noted that at the time of the production of the synthetic image every reference direction for obtaining the depth map, there are used the photographed images in the reference directions, and the rectified images obtained by rectifying the photographed images in the reference directions.

The depth map in the reference directions thus obtained is the information exhibiting the distances on the real space to the respective objects when viewed in the reference directions from the photographing portion 12 (vehicle 11), in a word, to the respective subjects on the photographed images.

By the way, in the example described with reference to FIG. 8, the description has been given with respect to the case where the depth map is produced with respect to the respective reference directions from the direction D11 to the direction D16. In this case, although the distance to the same object is calculated every reference direction, in a word, every depth map, an average value or the like of these distances may be obtained as a presentative distance to the object concerned. As a result, one presentative distance is obtained for one object.

Moreover, in obtaining the presentative distance of the object, of the reference directions from the direction D11 to the direction D16, the distance to the object exhibited by the depth map of the reference direction closest to the direction directly confronting the object may be set as the representative distance of the object concerned. The reason for this is because in the depth map of the reference direction closer to the direction directly confronting the object, the reliability of the distance to the object is high.

Example of Configuration of Three-Dimensional Measurement Apparatus

Figure 9:
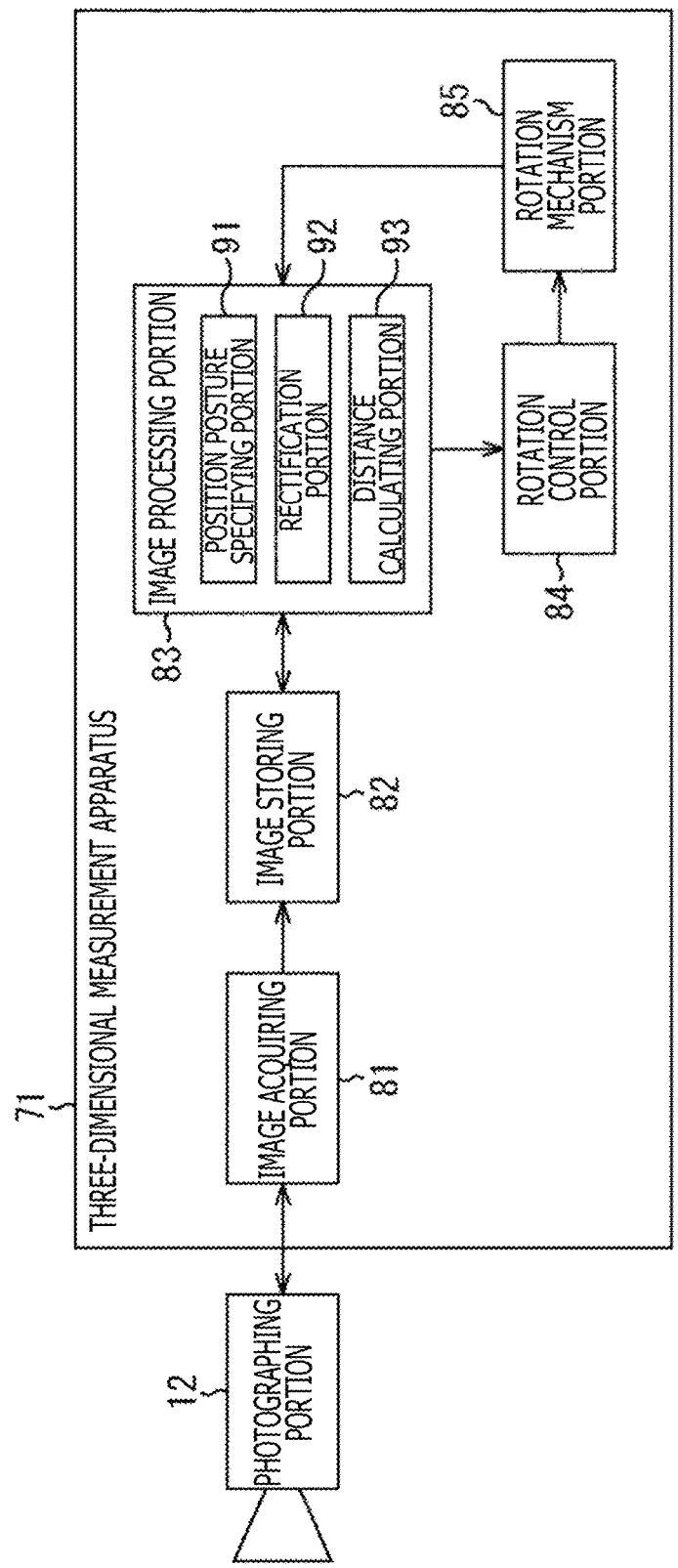
FIG. 9 is a block diagram depicting an example of a configuration of a three-dimensional measurement apparatus.

Next, a description will now be given with respect to an example of a configuration of a three-dimensional measurement apparatus described above. FIG. 9 is a block diagram depicting an example of a configuration of an embodiment of a three-dimensional measurement apparatus to which the present technique is applied.

The photographing portion 12 described above is connected to the three-dimensional measurement apparatus 71 depicted in FIG. 9, and the photographed image obtained through the photographing by the photographing portion 12 is supplied to the three-dimensional measurement apparatus 71.

It should be noted that the photographing portion 12 may be provided in the three-dimensional measurement apparatus 71. In addition, the photographing portion 12 may be a camera or the like which can photograph the two-dimensional image having a plurality of pixels which are arranged side by side in the horizontal direction and in the vertical direction on the light receiving surface like the example described above. Alternatively, the photographing portion 12 may also be one-dimensional line sensor which has the light receiving surface constituted by only the pixels arranged side by side in the horizontal direction, and photographs one-dimensional image. In the following, the description is continuously given on the assumption that the photographing portion 12 is the camera or the like which can photograph the two-dimensional image, in a word, is the one which has the two-dimensional image sensor.

The three-dimensional measurement apparatus 71 has an image acquiring portion 81, an image storing portion 82, an image processing portion 83, a rotation control portion 84, and a rotation mechanism portion 85.

The image acquiring portion 81 acquires the photographed image from the photographing portion 12, and executes various kinds of processing such as development processing as may be necessary for the photographed image acquired, thereby supplying the resulting photographed image to the image storing portion 82. The image storing portion 82 stores therein the various kinds of images such as the photographed image supplied thereto from the image acquiring portion 81, and the rectified image supplied thereto from the image processing portion 83, and the information.

The image processing portion 83 executes various kinds of processing such as the measurement processing for producing the depth stop by using the photographed images and the like stored in the image storing portion 82 as may be necessary. The image processing portion 83 has a position posture specifying portion 91, a rectification portion 92, and a distance calculating portion 93.

The position posture specifying portion 91 calculates the position and the posture on the three-dimensional space of the photographing portion 12 when the images to be photographed are photographed by, for example, Simultaneous Localization And Mapping (SLAM) or the like on the basis of the photographed images stored in the image storing portion 82, thereby specifying the position and the posture of the photographing portion 12 at each of the times. Here, the posture of the photographing portion 12 means the photographing direction of the photographing portion 12, in a word, the direction of the optical axis.

For example, when the position and the posture of the photographing portion 12 are calculated by the SLAM, the position posture specifying portion 91 holds therein a three-dimensional map constituted by a position of an arbitrary object called a landmark on the three-dimensional space, and a feature amount(s) extracted from an image(s) of the landmark. The position posture specifying portion 91 calculates the position and the posture of the photographing portion 12 at each of the times on the basis of the three-dimensional map and the photographed image(s) while the three-dimensional map is updated as may be necessary.

By the way, although in the following, a description will be given with respect to an example in which the position posture specifying portion 91 specifies the position and the posture of the photographing portion 12 by the SLAM, the method of specifying the position and the posture of the photographing portion 12 may be any other method.

For example, the position posture specifying portion 91 may continuously acquire an angle of rotation, and a steering angle of a wheel of the vehicle 11 from the vehicle 11. In this case, the position posture specifying portion 91 may obtain the movement distance of the vehicle 11 from the angle of rotation, and obtain the direction of the vehicle 11 from the steering angle, thereby specifying the position and the posture of the vehicle 11, in a word, the photographing portion 12. In addition thereto, for example, the position posture specifying portion 91 may specify the position and the posture of the photographing portion 12 by utilizing a Global Positioning System (GPS), a gyro sensor or the like.

When the position posture specifying portion 91 has an Inertial Measurement Unit (IMU) such as an acceleration sensor or a gyro sensor, for example, the position posture specifying portion 91 integrates the values measured with the IMU, thereby measuring the relative motion of the position and the posture of the photographing portion 12 with respect to a predetermined object (object).

The rectification portion 92 rectifies the photographed images stored in the image storing portion 82 on the basis of the information regarding the angle of rotation of the photographing portion 12 supplied thereto from the rotation mechanism portion 85, and the position and the posture of the photographing portion 12 specified by the position posture specifying portion 91. For example, the rectification portion 92 can execute the rectification processing as the processing for rectifying the photographed images. As a result, the processing followed by the enlargement or the reduction is executed in such a way that the same object appears on the mutually corresponding lines (pixel lines) in a plurality of photographed images, in a word, on the pixel lines depicting the same positional relationship.

The distance calculating portion 93 calculates the distances to the objects in the respective azimuth directions on the basis of the information regarding the angle of the rotation supplied thereto from the rotation mechanism portion 85, the position and the posture of the photographing portion 12 specified by the position posture specifying portion 91, the rectified images obtained in the rectification portion 92, and the photographed images in the reference directions stored in the image storing portion 82. That is to say, the depth maps in the reference directions are produced. Specifically, for example, the distance calculating portion 93 obtains the distance meeting the relationship of Expression (3) described above by the least-square method, thereby producing the depth map(s).

The rotation control portion 84 controls the drive for the rotation mechanism portion 85 in accordance with an instruction issued from the image processing portion 83. The rotation mechanism portion 85, for example, is constituted by the shaft 13, the rotary encoder, and the like, and rotates the photographing portion 12 with the shaft 13 as the center of rotation (rotational axis) in accordance with the control made by the rotation control portion 84. In addition, the rotation mechanism portion 85 supplies the information regarding the angle of the rotation exhibiting the angle of the rotation, or the like of the photographing portion 12 at each of the times to the image processing portion 83.

It should be noted that although a description is given here with respect to an example in which the rotation mechanism portion 85 rotates the photographing portion 12, for example, when there is adopted the constitution described with reference to FIG. 4, the rotation mechanism portion 85 does not rotate the photographing portion 12, but rotates the mirror 41.

Description of Measurement Processing

Figure 10:
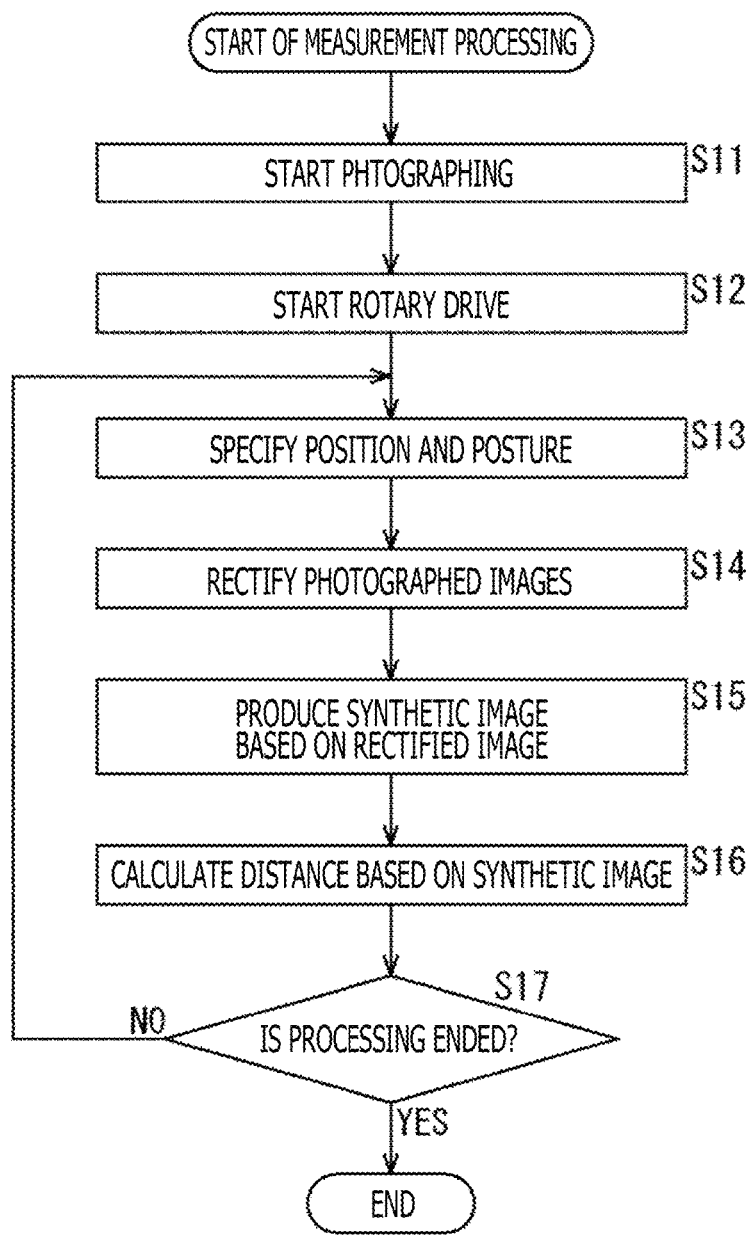
FIG. 10 is a flow chart explaining measurement processing.

Subsequently, a concrete operation of the three-dimensional measurement apparatus 71 will now be described. That is to say, hereinafter, measurement processing by the three-dimensional measurement apparatus 71 will be described with reference to a flow chart of FIG. 10. It should be noted that although this measurement processing may be executed during the traveling of the vehicle 11 equipped with the three-dimensional measurement apparatus 71, or may be executed during stop of the traveling of the vehicle 11, in the following, the description will be continuously given on the assumption that the vehicle 11 is in traveling.

In Step S11, the image acquiring portion 81 instructs the photographing portion 12 to start the photographing of the image(s) to be photographed. The photographing portion 12, for example, continuously photographs the images to be photographed at predetermined time intervals in accordance with the instruction issued from the image acquiring portion 81, and supplies the photographed images to the image acquiring portion 81. It should be noted that the photographed image may be a moving image or may be a still image.

The image acquiring portion 81 executes the various kinds of processing such as the development processing as may be necessary for the photographed images supplied thereto from the photographing portion 12, and supplies the resulting photographed images to the image storing portion 82 which in turn stores therein the resulting photographed images.

In Step S12, the rotation control portion 84 controls the drive for the rotation mechanism portion 85 in accordance with an instruction issued from the image processing portion 83. Then, the rotation mechanism portion 85 starts the rotary drive for the photographing portion 12 in accordance with the control made by the rotation control portion 84.

At this time, for example, the rotation control portion 84 controls the rotary drive in such a way that the photographing portion 12 is rotated at a constant rotational speed (angular velocity).

It should be noted that the rotational speed of the photographing portion 12 is not necessarily the constant speed. Thus, the rotational speed may be set at the constant speed while the photographing portion 12 makes one rotation, and may be changed whenever the photographing portion 12 makes one rotation. Moreover, when the traveling speed or the traveling direction of the vehicle 11 relating to the angle of rotation, and the like of the wheel can be acquired in one way or another, the rotation control portion 84 may change the rotational speed of the photographing portion 12 in response to the traveling speed or the traveling direction. As a result, the distortion or the like, of the locus of the object in the synthetic image, which is caused by the traveling of the vehicle 11 can be reduced, and thus the distance estimation can be carried out with the higher accuracy.

When the photographing of the image(s) to be photographed is started in such a way, and the rotary drive for the photographing portion 12 is started, the photographed images obtained through the photographing in the positions at the time of the rotational movement of the photographing portion 12 are successively stored in the image storing portion 82. In addition, at this time, the rotation mechanism portion 85 supplies the information regarding the angle of rotation of the photographing portion 12 at the each of the times to the image processing portion 83. It should be noted that the image processing portion 83 may supply the information exhibiting the rotational position of the photographing portion 12, which is obtained from the information regarding the angle of rotation supplied from the rotation mechanism portion 85, to the image storing portion 82, and may instruct the image storing portion 82 to store the information exhibiting the rotational position and the photographed image at the same time so as for them to correspond to each other.

In Step S13, the position posture specifying portion 91 specifies the position and the posture of the photographing portion 12 when each of the images to be photographed is photographed on the basis of the photographed images stored in the image storing portion 82, and the three-dimensional maps held herein. That is to say, the position and the posture of the photographing portion 12 are calculated by the SLAM.

In Step S14, the rectification portion 92 rectifies the photographed images stored in the image storing portion 82 on the basis of the information regarding the angle of rotation of the photographing portion 12 supplied thereto from the rotation mechanism portion 85, and the positions and the postures of the photographing portion 12, which are specified by the position posture specifying portion 91.

Specifically, for example, the rectification portion 92 executes the processing described with reference to FIG. 8 to produce the rectified image from the photographed images at the respective times. That is to say, the rectification portion 92 specifies the direction of the optical axis of the photographing portion 12 at the time of the photographing of the photographed image as the processing object on the basis of the information regarding the angle of rotation, and the position and the posture of the photographing portion 12, and specifies the reference direction in which the rectified image is produced from the specification result. Then, the rectification portion 92 produces the rectified image through the rectification from the photographed image as the processing object, and the photographed image in the reference direction, and supplies the resulting rectified image to the image storing portion 82, thereby causing the image storing portion 82 to store the resulting rectified image. As a result, there is obtained a state in which at least the photographed images and the rectified image are stored in the image storing portion 82.

In Step S15, the distance calculating portion 93 produces the synthetic image in the respective reference directions on the basis of the information regarding the angle of rotation supplied thereto from the rotation mechanism portion 85, the position and the posture of the photographing portion 12, and the rectified image and the photographed images in the reference directions which are stored in the image storing portion 82.

That is to say, with regard to the respective lines of the photographed images in the reference directions, in a word, the respective pixel lines in the horizontal direction, the distance calculating portion 93 sets the line as the line image. In addition, the distance calculating portion 93 specifies the line of the respective rectified images in which the corresponding point(s) common to the line image concerned is(are) contained, and extracts the line image from the respective rectified images. Here, the information regarding the angle of rotation, and the position and the posture of the photographing portion 12, for example, are used for the specification of the line in which the corresponding point(s) in the rectified image is(are) contained.

Then, the distance calculating portion 93 arranges the line images in which the corresponding points common to one another are contained, side by side in order of the time, synthesizes them, and produces the synthetic image. As a result, every horizontal line of the photographed images in the reference directions, the synthetic image corresponding to these lines is obtained.

By the way, the positions in the horizontal direction of the respective line images at the time of the synthesis of the line images may be adjusted in response to the information regarding the angle of rotation, and the position and the posture of the photographing portion 12, for example. Such adjustment of the synthesis position in the horizontal direction is effective when the rotational speed of the photographing portion 12 is not constant, when the vehicle 11 travels, or the like.

In Step S16, the distance calculating portion 93, every pixel of the photographed images in the reference directions, calculates the distance to the object (subject) corresponding to these pixels on the basis of synthetic image, and produces the depth map from the calculation result.

Specifically, for example, the distance calculating portion 93, with respect to the respective pixels of the line images in the reference directions constituting the synthetic image, detects the pixels, and the area on the synthetic image constituted by the pixels having the same luminance value(s) (pixel value(s)) as that (those) of these pixels, and sets the detected area as the area of the locus of the object. At this time, the pixels adjacent to one another on the synthetic mage, more specifically, the pixel area that is constituted by the pixels approximately continuously arranged side by side and that has the same luminance value ought to become the area exhibiting the locus of the object.

Moreover, the distance calculating portion 93 calculates the distance to the object on the basis of the amplitude of the tangent curve as the locus of the object on the synthetic image. That is to say, with respect to the pixels corresponding to the object on the synthetic image, the distance meeting the relationship of Expression (3) described above is obtained from the pixel positions, and the information regarding the angles of rotation by the least-square method, and the depth map is produced.

The depth map in the reference direction at the respective times is produced in such a way while the photographing portion 12 is rotated, so that the distance to the object in every direction can be continuously measured. In addition, if the depth map as the result of the measurement of the distance, in a word, the result of the distance estimation, the environment in the circumstances of the vehicle 11, such as the situation of the arrangement of the object in every direction, can be accurately grasped.

For example, the distance from the vehicle 11 (photographing portion 12) to the object in each of the respective azimuths at the predetermined time can be obtained from the result of specification of the position and the posture of the photographing portion 12 that are specified by the position posture specifying portion 91, and from the three-dimensional map held by the position posture specifying portion 91. Likewise, also from the depth map, the distance from the vehicle 11 to the object in each of the azimuths at the predetermined time can be obtained, and the resulting distance ought to be equal to the distance obtained from the three-dimensional map as long as the object stands still.

For example, the image processing portion 83 calculates a difference between the distance obtained from the three-dimensional map by utilizing this fact, and the distance exhibited by the depth map, thereby detecting a moving object existing in the circumstances of the vehicle 11 from the magnitude of the difference, and carries out the tracking of the moving object from the detection results at the times. In a word, the tracking of the position of the moving object is carried out. Here, the possibility that the detected moving object, for example, is a walker, a vehicle such as an oncoming vehicle, a bicycle, a motorcycle, or an obstacle such as a tool of road construction is high.

Then, for example, the image processing portion 83 executes the processing for displaying an image, or issuing an alarm by a voice or the like to a driver of the vehicle 11 in such a way that the vehicle 11 can more safely travel in response to the result of detection of the moving object, in a word, the danger due to the obstacle or the like can be readily avoided. As a result, the safety at the time of the traveling of the vehicle 11 can be improved.

In Step S17, the three-dimensional measurement apparatus 71 determines whether or not the processing is ended. When it is determined in Step S17 that the processing is not yet ended, the processing returns back to Step S13, and the pieces of processing described above are repetitively executed.

On the other hand, when it is determined in Step S17 that the processing is ended, the three-dimensional measurement apparatus 71 stops the pieces of processing in the respective portions, and the measurement processing is ended.

In the manner as described above, the three-dimensional measurement apparatus 71 causes the photographing portion 12 to photograph the images to be photographed while the photographing portion 12 is rotated, and produces the synthetic image on the basis of the photographed images in the reference directions, and the rectified image obtained from the photographed images in the directions different from the reference directions. Then, the three-dimensional measurement apparatus 71 detects the area of the same luminance value on the synthetic image as the locus of the object, thereby producing the depth map.

In such a way, a plurality of photographed images, especially, three or more photographed images obtained through the photographing during the rotation of the photographing portion 12 are used, thereby enabling the distance estimation to be carried out with higher accuracy. In addition thereto, the area having the same luminance value is set as the area exhibiting the locus of the object, and the amplitude of the tangent curve as the locus of the object is used, thereby enabling the distance estimation to be simply carried out with the less arithmetic operation amount.

Modified Example 1 of First Embodiment

Figure 11:
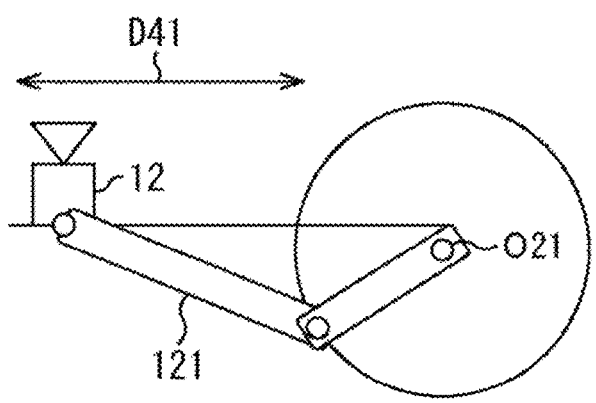
FIG. 11 is a view explaining drive for the photographing portion.

In addition, although in the foregoing, the description has been given with respect to the example in which the photographing portion 12 is rotated, alternatively, for example, as depicted in FIG. 11, the photographing portion 12 may be caused to make a reciprocating motion by a linear motion mechanism. By the way, in FIG. 11, portions corresponding to those in FIG. 1 are assigned the same reference numerals, and a description thereof is suitably omitted here.

In an example depicted in FIG. 11, a linear motion mechanism 121 constituted by two arms linked to each other is connected to the photographing portion 12. One end of the linear motion mechanism 121 is fixed to a central position O21, and the other end of the linear motion mechanism 121 is fixed to the photographing portion 12.

At the time of the photographing of the image to be photographed, the rotation control portion 87 rotates the arm one end of which is fixed to the central position O21, with the central position O21 as a center, thereby causing the photographing portion 12 to make the reciprocating motion in a direction indicated by an arrow D41. In a word, the driving of the linear motion mechanism 121 is controlled in such a way that the photographing portion 12 makes the reciprocating motion on a straight line.

By adopting such a mechanism as well, the three-dimensional measurement apparatus 71, although not every direction, can obtain the depth map in the front of the photographing portion 12. In this case, since the locus of the object on the synthetic image becomes a straight line, the distance to the object is calculated on the basis of an inclination of the straight line.

Application Example

By the way, the technique according to the present disclosure can be applied to various products. For example, the technique according to the present disclosure may also be realized in the form of an apparatus with which any kind of vehicle of an automobile, an electric vehicle, a hybrid electric vehicle, a motorcycle or the like is equipped. In addition, the technique according to the present disclosure may also be realized in the form of an apparatus with which a heavy machine for construction such as a bulldozer or a crane track, a drone, a robot, a planetary probe, or the like is equipped.

Figure 12:
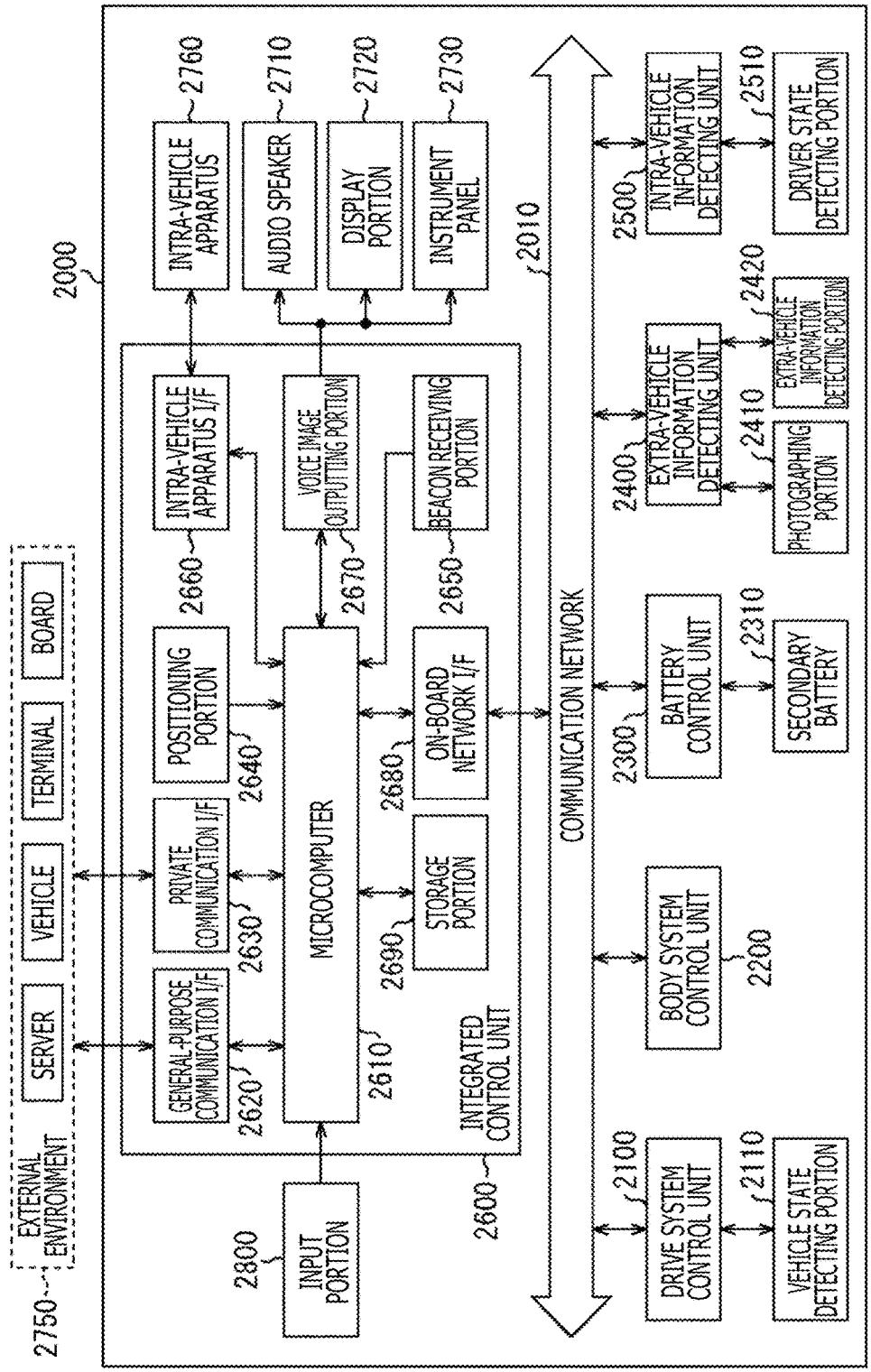
FIG. 12 is a block diagram depicting an example of a schematic configuration of a vehicle control system.

FIG. 12 is a block diagram depicting an example of a schematic configuration of a vehicle control system 2000 to which the technique according to the present disclosure can be applied. The vehicle control system 2000 is provided with a plurality of electronic control units connected to one another through a communication network 2010. In the example depicted in FIG. 12, the vehicle control system 2000 is provided with a drive system control unit 2100, a body system control unit 2200, a battery control unit 2300, an extra-vehicle information detecting unit 2400, an intra-vehicle detecting unit 2500, and an integrated control unit 2600. The communication network 2010 through which a plurality of control units are connected to one another, for example, may be an on-board communication network, complying with arbitrary standards, such as a Controller Area network (CAN), a Local Interconnect Network (LIN), a Local Area Network (LAN) or a FlexRay (registered trademark).

Each of the control units is provided with a microcomputer for executing arithmetic operation processing in accordance with various kinds of programs, a storage portion for storing therein a program to be executed by the microcomputer, or parameters and the like used in various kinds of arithmetic operations, and a drive circuit for driving devices or apparatuses as various kinds of control objects. Each of the control units is provided with a network I/F through which a communication is carried out with other control units via a communication network 2010, and is also provided with a communication I/F through which a communication is carried out in the form of a wired communication or a wireless communication with an intra-vehicle device or apparatus or an extra-vehicle device or apparatus, a sensor or the like. In FIG. 12, a microcomputer 2610, a general-purpose communication I/F 2620, a private communication I/F 2630, a positioning portion 2640, a beacon receiving portion 2650, an intra-vehicle apparatus I/F 2660, an audio image outputting portion 2670, an on-board network I/F 2680, and a storage portion 2690 are illustrated as a functional configuration of the integrated control unit 2600. Likewise, any other control unit is provided with a microcomputer, a communication I/F, a storage portion, and the like.

For example, the three-dimensional measurement apparatus 71 described above may also be constituted by the microcomputer 2610, the positioning portion 2640, the storage portion 2690, and the like.

The drive system control unit 2100 controls the operation of the device or apparatus associated with the drive system of the vehicle in accordance with various kinds of programs. For example, the drive system control unit 2100 functions as a controller for a driving force generator, a driving force transferring mechanism, a steering mechanism, a braking controller, and the like. In this case, the driving force generator such as an internal combustion engine or a driving motor serves to generate a driving force for a vehicle. The driving force transferring mechanism serves to transfer the driving force to wheels. The steering mechanism serves to adjust a steering angle of a vehicle. The braking controller serves to generate a braking force for a vehicle. The drive system control unit 2100 may have a function as a controller such as an Antilock Brake System (ABS) or Electronic Stability Control (ESC).

A vehicle state detecting portion 2110 is connected to the drive system control unit 2100. The vehicle state detecting portion 2110, for example, includes at least one of those including a gyro sensor for detecting an angular velocity of an axis rotary motion of a vehicle body, an acceleration sensor for detecting an acceleration of a vehicle, and a sensor for detecting a manipulated variable of accelerator pedal, a manipulated variable of brake pedal, a steering angle of a steering wheel, an engine speed, a rotational speed of a wheel, or the like. The drive system control unit 2100 executes arithmetic operation processing by using a signal inputted thereto from the vehicle state detecting portion 2110 to control the internal combustion engine, the driving motor, an electric driven power steering device, a brake device or the like.

The body system control unit 2200 controls the operations of the various kinds of devices or apparatuses with which the vehicle body is equipped in accordance with the various kinds of programs. For example, the body system control unit 2200 functions as a controller for a keyless entry system, a smart key system, a power window device, or various kinds of lamps such as a head lamp, a back lamp, a brake lamp, a winker, or a fog lamp. In this case, an electric wave transmitted from a mobile phone substituted for a key, or signals for various kinds of switches can be inputted to the body system control unit 2200. The body system control unit 2200 accepts the input of the electric wave or the signals to control a door lock device, a power window device, the lamps or the like of the vehicle.

The battery control unit 2300 controls a secondary battery 2310 as an electric power supply source for the driving motor in accordance with the various kinds of programs. For example, the information regarding a battery temperature, a battery output voltage, a battery remaining power, or the like is inputted from a battery device provided with the secondary battery 2310 to the battery control unit 2300. The battery control unit 2300 executes the arithmetic operation processing by using these signals to carry out the temperature adjustment control for the secondary battery 2310, the control for a cooling device with which the battery device is equipped, or the like.

The extra-vehicle information detecting unit 2400 detects information regarding the outside of the vehicle equipped with the vehicle control system 2000. For example, at least either a photographing portion 2410 or an extra-vehicle information detecting portion 2420 is connected to the extra-vehicle information detecting unit 2400. The photographing portion 2410 includes at least one of those including a Time-of-Flight (ToF) camera, a stereo camera, a monocular camera, an infrared camera, and other cameras. For example, the photographing portion 2410 may be made the photographing portion 12 described above. The extra-vehicle information detecting portion 2420, for example, includes an environment sensor for detecting the current weather or climate, or a circumstance information detecting sensor for detecting other vehicles, an obstacle, a walker or the like in the circumstances of the vehicle equipped with the vehicle control system 2000.

The environment sensor, for example, may be at least one of those including a raindrop sensor for detecting rainy weather, a fog sensor for detecting fog, a sunlight sensor for detecting a sunlight degree, and a snow sensor for detecting snowfall. The circumstance information detecting sensor may be at least one of those including an ultrasonic wave sensor, a radar device, and Light Detection and Ranging, Laser Imaging Detection and Ranging (LIDAR) device. These photographing portion 2410 and extra-vehicle information detecting portion 2420 may be provided in the form of independent sensors or devices, respectively, or may be provided in the form of a device in which a plurality of sensors or devices are integrated with one another.

Figure 13:
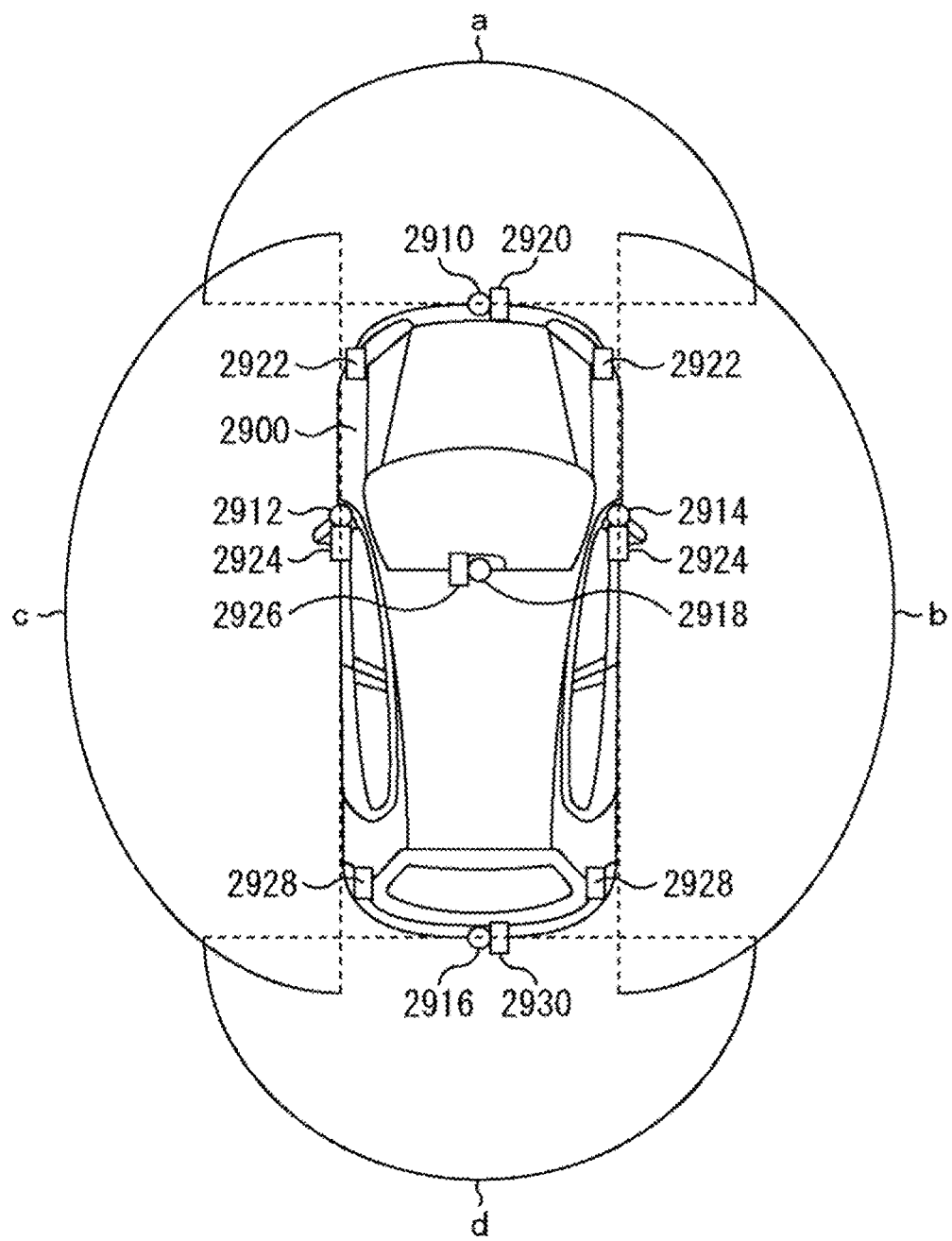
FIG. 13 is an explanatory view depicting an example of installation positions of an extra-information detecting portion and a photographing portion.

Here, FIG. 13 depicts an example of installation positions of the photographing portion 2410 and the extra-vehicle information detecting portion 2420. Photographing portions 2910, 2912, 2914, 2916, and 2918, for example, are provided in at least a position of those including a front nose, side mirrors, a rear bumper, a back door, and an upper portion of a front glass within a vehicle interior. The photographing portion 2910 with which the front nose is provided, and the photographing portion 2918 with which the upper portion of the front glass within the vehicle interior is provided mainly acquire images in the front of the vehicle 2900. The photographing portions 2912 and 2914 with which the side mirrors are provided mainly acquire images on the sides of the vehicle 2900. The photographing portion 2916 with which the rear bumper or the back door is provided mainly acquires an image in the rear of the vehicle 2900. The photographing portion 2918 with which the upper portion of the front glass within the vehicle interior is provided is mainly used for detection of a preceding vehicle or a walker, an obstacle, a traffic signal, a traffic sign, a traffic lane or the like.

By the way, FIG. 13 depicts an example of photographing ranges of the respective photographing portions 2910, 2912, 2914, and 2916. The photographing range a depicts a photographing range of the photographing portion 2910 provided in the front nose, the photographing ranges b and c depict photographing ranges of the photographing portions 2912 and 2914 which are provided in the side mirrors, respectively. The photographing range d depicts a photographing range of the photographing portion 2916 provided either in the rear bumper or in the back door. For example, the pieces of data on the images photographed by the photographing portions 2910, 2912, 2914, and 2916 are accumulated, thereby obtaining a bird's-eye-view image in which the vehicle 2900 is viewed from the upper side.

The extra-vehicle information detecting portions 2920, 2922, 2924, 2926, 2928, and 2930 which are provided in the front, rear, sides, corners of the vehicle 2900, and in the upper portion of the front glass within the vehicle interior, for example, may be an ultrasonic wave sensor(s) or a radar device(s). The extra-vehicle information detecting portions 2920, 2926, and 2930 which are provided in the front nose, the rear bumper, the backdoor of the vehicle, and the upper portion of the front glass within the vehicle interior, for example, may be an LIDAR device(s). These extra-vehicle information detecting portions 2920 to 2930 are mainly used for detection of the preceding vehicle, the walker, the obstacle or the like.

Referring back to FIG. 12, the description will now be continuously given. The extra-vehicle information detecting unit 2400 instructs the photographing portion 2410 to photograph the vehicle image of the vehicle exterior, and receives the data on the image thus photographed. In addition, the extra-vehicle information detecting unit 2400 receives detection information from the extra-vehicle information detecting portion 2420 connected thereto. When the extra-vehicle information detecting portion 2420 is the ultrasonic wave sensor, the radar device or the LIDAR device, the extra-vehicle information detecting unit 2400 transmits the ultrasonic wave, the electromagnetic wave or the like, and receives the information regarding the reflected wave received. The extra-vehicle information detecting unit 2400 may execute object detecting processing or distance detecting processing for the human being, the vehicle, the obstacle, the traffic sign, the characters on the road surface, or the like on the basis of the received information. The extra-vehicle information detecting unit 2400 may execute environment recognizing processing for recognizing the rainfall, the fog, the surface situation or the like on the basis of the received information. The extra-vehicle information detecting unit 2400 may calculate the distance to the object of the vehicle exterior on the basis of the received information.

In addition, the extra-vehicle information detecting unit 2400 may execute image recognizing processing for recognizing the human being, the vehicle, the obstacle, the traffic sign, the characters on the road surface, or the like or may execute distance detecting processing on the basis of the received image data. The extra-vehicle information detecting unit 2400 may execute processing for distortion correction, alignment or the like for the received image data, and may synthesize the data on the image photographed by the different photographing portion 2410, thereby producing the bird's-eye-view image or the panorama image. The extra-vehicle information detecting unit 2400 may execute point-of-view converting processing by using the data on the image(s) obtained through the photographing by the different photographing portion 2410.

The intra-vehicle information detecting unit 2500 detects the information regarding the vehicle interior. For example, a driver state detecting portion 2510 for detecting a state of a driver is connected to the intra-vehicle information detecting unit 2500. The driver state detecting portion 2510 may include a camera for photographing a driver, a biological sensor for detecting biological information of a driver, a microphone for sound-collecting a sound in a vehicle interior, or the like. The biological sensor, for example, is provided in a seating surface, the steering wheel or the like, and detects the biological information regarding a passenger who sits in the seat, or a driver who gets behind the steering wheel. The intra-vehicle information detecting unit 2500 may calculate the degree of fatigue or the degree of concentration of a driver, or determine whether or not a driver dozes on the basis of the detection information inputted thereto from the driver state detecting portion 2510. The intra-vehicle information detecting unit 2500 may execute processing such as noise canceling processing for the voice signal of the collected sounds.

The integrated control unit 2600 controls the entire operation within the vehicle control system 2000 in accordance with the various kinds of programs. An input portion 2800 is connected to the integrated control unit 2600. The input portion 2800 is realized in the form of a device or unit, with which an input manipulation can be carried out by a passenger, such as a touch panel, a button, a microphone, a lever, a switch or the like. The input portion 2800, for example, may be a remote control device utilizing inferred rays or other electric waves, or may be an external connection apparatus such as a mobile phone or a Personal Digital Assistant (PDA) corresponding to a manipulation for the vehicle control system 2000. The input portion 2800, for example, may be a camera. In this case, a passenger can input information through his/her gesture. Moreover, the input portion 2800, for example, may include an input control circuit for producing an input signal based on information which is inputted by a passenger or the like using the input portion 2800 described above, and outputting the resulting input signal to the integrated control unit 2600, or the like. The passenger or the like inputs various kinds of data to the vehicle control system 2000, or instructs the vehicle control system 2000 to carry out processing operation by manipulating the input portion 2800.

The storage portion 2690 may include a Random Access Memory (RAM) for storing therein various kinds of programs which are to be executed by the microcomputer, and a Read Only Memory (ROM) for storing therein various kinds of parameters, the arithmetic operation result, the sensor values or the like. In addition, the storage portion 2690 may be realized in the form of a magnetic storage device such as a Hard Disc Drive (HDD), a semiconductor storage device, an optical storage device, a magneto-optical storage device or the like.

The general-purpose communication I/F 2620 is a general-purpose communication I/F which mediates communications with various apparatuses existing in an external environment 2750. The general-purpose communication I/F 2620 may be mounted with a cellular communication protocol such as Global System of Mobile Communications (GSM) (registered trademark), WiMAX, a Long Term Evolution (LTM) or LTE-Advanced (LTE-A), or other wireless communication protocol such as a Wireless LAN (Wi-wi (registered trademark)). The general-purpose communication I/F 2620, for example, may be connected to an apparatus (for example, an application server or a control server) existing on an external network (for example, the Internet, a cloud network or a business's specific network) through a base station or an access point. In addition, the general-purpose communication I/F 2620, for example, may be connected to a terminal (for example, a walker's or shop's terminal, or a Machine Type Communication (MTC) terminal which exists in the vicinity of the vehicle by using a Peer To Peer (P2P) technique.

The private communication I/F 2630 is a communication I/F for supporting a communication protocol which is formulated for the purpose of being used in the vehicle. The private communication I/F 2630, for example, may be mounted with a standard protocol such as a Wireless Access in Vehicle Environment (WAVE) as a combination of IEEE802.11p of a lower layer and IEEE1609 of an upper layer, or a Dedicated Short Range Communication (DSRC). The private communication I/F 2630, typically, carries out a V2X communication as a concept including one or more of those including a Vehicle-to-Vehicle communication, a Vehicle-to-Infrastructure communication and a Vehicle-to-Pedestrian communication.

The positioning portion 2640, for example, receives a Global Navigation Satellite System (GNSS) signal (for example, a GPS signal from a GPS satellite) sent thereto from a GNSS satellite and carries out the positioning, thereby producing the position information containing therein latitude, longitude and altitude of the vehicle. It should be noted that the positioning portion 2640 may specify the current position by the exchange of the signal with the wireless access point, or may acquire the position information from a terminal such as a mobile phone, a PHS or a smart phone having the positioning function.

The beacon receiving portion 2650, for example, receives an electric wave or an electromagnetic wave which is transmitted from a wireless station or the like installed on the road, and acquires information regarding a current position, congestion, closure to vehicular traffic, a time required or the like. It should be noted that the function of the beacon receiving portion 2650 may be included in the private communication I/F 2630 described above.

The intra-vehicle apparatus I/F 2660 is a communication interface which mediates the connection between the microcomputer 2610 and the various apparatuses existing inside the vehicle. The intra-vehicle apparatus I/F 2660 may establish wireless connection by using a wireless communication protocol such as the wireless LAN, Bluetooth (registered trademark), a Near Field Communication (NFC) or a wireless USB (WUSB). In addition, the intra-vehicle apparatus I/F 2660 may establish wired connection through a connection terminal not depicted (and a cable if necessary). The intra-vehicle apparatus I/F 2660, for example, exchanges the control signal(s) or the data signal(s) with a mobile phone or a wearable apparatus which a passenger has, or an information apparatus which is brought into or mounted to the vehicle.

The on-board network I/F 2680 is an interface which mediates the communication between the microcomputer 2610 and the communication network 2010. The on-board network I/F 2680 transmits/receives the signal or the like in accordance with a predetermined protocol supported by the communication network 2010.

The microcomputer 2610 of the integrated control unit 2600 controls the vehicle control system 2000 in accordance with the various kinds of programs on the basis of the information which is acquired through at least one of those including the general-purpose communication I/F 2620, the private communication I/F 2630, the positioning portion 2640, the beacon receiving portion 2650, the intra-vehicle apparatus I/F 2660, and the on-board network I/F 2680. For example, the microcomputer 2610 may calculate a control target value for the driving force generating device, the steering mechanism or the braking device on the basis of the information acquired regarding the interior and exterior of the vehicle, and may output a control instruction to the driving system control unit 2100. For example, the microcomputer 2610 may carry out cooperative control for the collision avoidance or shock mitigation of the vehicle, the follow-up traveling based on the vehicle-to-vehicle distance, the vehicle speed maintenance traveling, the automatic driving or the like.

The microcomputer 2610 may create local map information containing information regarding the circumstances of the current position of the vehicle on the basis of the information which is acquired through at least one of those including the general-purpose communication I/F 2620, the private communication I/F 2360, the positioning portion 2640, the beacon receiving portion 2650, the intra-vehicle apparatus I/F 2660, and the on-board network I/F 2680. In addition, the microcomputer 2610 may anticipate the danger of the collision of the vehicle, the proximity of the walker or the like, the access to the road closed to vehicle traffic, or the like on the basis of the information acquired, thereby creating a signal for alarm. The signal for alarm, for example, may be a signal with which an alarm sound is generated or the alarm lamp is lighted.

The voice image outputting portion 2670 transmits an output signal of at least either the voice or the image to an output device which can visually or aurally inform a passenger of a vehicle or a vehicle exterior of the information. In the example of FIG. 12, an audio speaker 2710, a display portion 2720, and an instrument panel 2730 are exemplified as the output device. The display portion 2720, for example, may include at least either an on-board display or a head-up display. The display portion 2720 may have an Augmented Reality (AR) display function. The output device may be other device other than these devices, such as a headphone, a projector or a lamp. When the output device is the display device, the display device visually displays the results obtained through the various kinds of processing executed by the microcomputer 2610, or the information received from other control unit, in the various forms such as a text, an image, a table, or a graph. In addition, when the output device is the voice outputting device, the voice outputting device converts an audio signal constituted by the reproduced voice data or acoustic data, or the like into an analog signal to aurally output the resulting analog signal.

By the way, in the example depicted in FIG. 12, at least two control units which are connected to each other through the communication network 2010 may be integrated with each other in the form of one control unit. Alternatively, each of the control units may be constituted by a plurality of control units. Moreover, the vehicle control system 2000 may be provided with another control unit not depicted. In addition, in the above description, another control unit may be made to have a part or all of the functions a role of which any of the control units plays. In a word, if the information is transmitted/received through the communication network 2010, then, predetermined arithmetic operation processing may be executed by any of the control units. Likewise, the sensor, or the device or apparatus which is connected to any of the control units may be connected to other control unit(s), and a plurality of control units may transmit/receive the detection information to/from one another through the communication network 2010.

It should be noted that a computer program for realizing the respective functions of the three-dimensional measurement apparatus 71 described with reference to FIG. 9 can be mounted to any of the control units, or the like. In addition, it is possible to provide a computer readable storage medium in which such a computer program is stored. The storage medium, for example, is a magnetic disc, an optical disc, a magneto-optical disc, a flash memory or the like. In addition, the computer program described above, for example, may be transmitted through the network without using the storage medium.

Example of Configuration of Computer

Moreover, the series of pieces of processing described above can be executed by the hardware, or by the software. When the series of pieces of processing are executed by the software, the program constituting that software is installed in the computer. Here, the computer includes a computer incorporated in the dedicated hardware, a computer, for example, a general-purpose personal computer which can execute the various kinds of functions by installing various kinds of programs, and the like.

Figure 14:
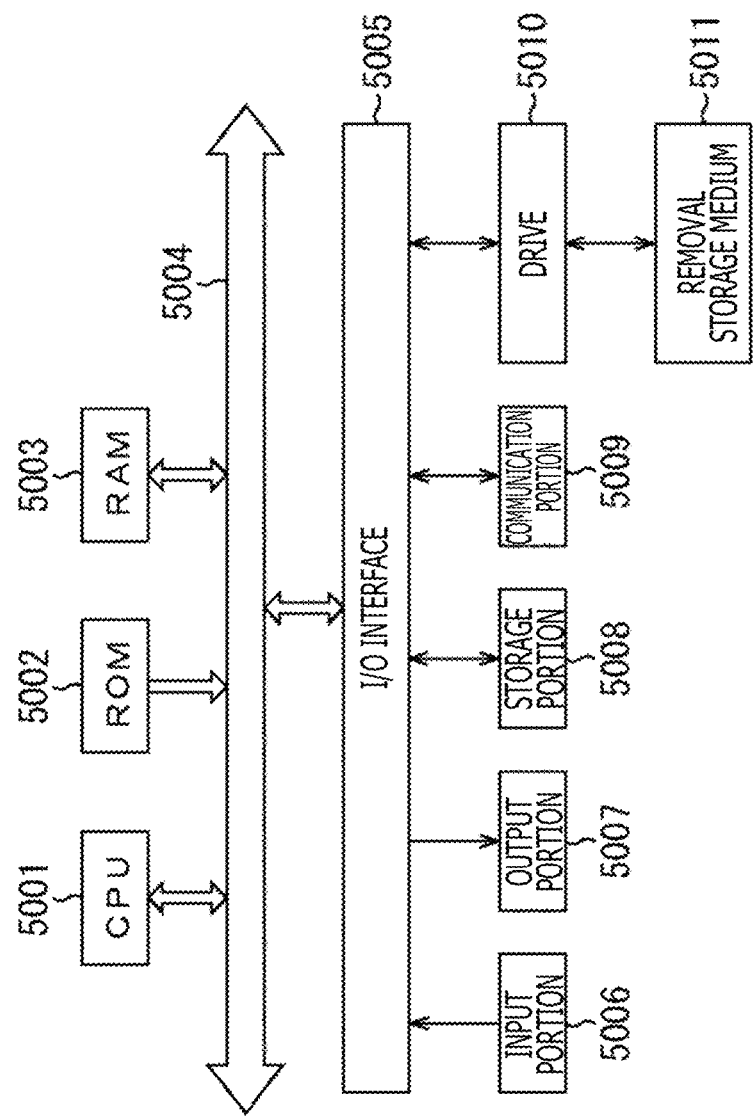
FIG. 14 is a block diagram depicting an example of a configuration of a computer.

FIG. 14 is a block diagram depicting an example of a configuration of hardware of a computer which executes the series of pieces of processing in accordance with a program.

In the computer, a Central Processing Unit (CPU) 5001, a ROM 5002, and a RAM 5003 are connected to one another through a bus 5004.

An I/O interface 5005 is further connected to the bus 5004. An input portion 5006, an output portion 5007, a storage portion 5008, a communication portion 5009, and a drive 5010 are connected to the I/O interface 5005.

The input portion 5006 is constituted by a keyboard, a mouse, a microphone, an image pickup element, or the like. The output portion 5007 is constituted by a display, a speaker, or the like. The storage portion 5008 includes a hard disc, a nonvolatile memory, or the like. The communication portion 5009 is constituted by a network interface, or the like. The drive 5010 drives a removable storage medium 5011 such as a magnetic disc, an optical disc, a magneto-optical disc or a semiconductor memory.

In the computer configured in the manner as described above, the CPU 5001, for example, loads the program stored in the storage portion 5008 into the RAM 5003 through the I/O interface 5005 and the bus 5004, and executes the program, thereby executing the series of pieces of processing described above.

The program which is to be executed by the computer (CPU 5001), for example, can be stored in the removable storage medium 5011 as a package media or the like to be provided. In addition, the program can be provided through a wired or wireless transmission medium such as a local area network, the Internet, or a digital satellite broadcasting.

In the computer, by mounting the removable storage medium 5011 to the drive 5010, the program can be installed in the storage portion 5008 through the I/O interface 5005. In addition, the program can be received in the communication portion 5009 through a wired or wireless transmission medium, thereby being installed in the storage portion 5008. In addition thereto, the program can be installed in the ROM 5002 or the storage portion 5008 in advance.

It should be noted that the program which is to be executed by the computer may be a program in accordance with which the pieces of processing are executed in time series along the order described in this specification, or may be a program in accordance with which the pieces of processing are executed in parallel or a necessary timing when a call is made, or the like.

In addition, the embodiment of the present technique by no means limited to the embodiment described above, and various changes can be made without departing from the subject matter of the present technique.

For example, the present technique can adopt a configuration of cloud computing in which a plurality of devices or apparatuses share one function through a network, and processes one function in collaboration with one another.

In addition, steps described in the flow chart described above can be executed by one device or apparatus, and in addition thereto can be executed so as to be shared among a plurality of devices or apparatuses.

Moreover, when a plurality of processing are contained in one step, a plurality of processing contained in one step can be executed by one device or apparatus, and in addition thereto can be executed so as to be shared among a plurality of devices or apparatuses.

Furthermore, the present technique can adopt the following constitutions.

(1)

A measurement apparatus, including:
 a rotation control portion controlling rotation of a photographing portion by a rotation mechanism in such a way that the photographing portion is rotated with a center of rotation as an axis in a state in which a distance from the center of rotation of the rotation mechanism to a focal point position of the photographing portion is a constant distance; and
 a distance calculating portion calculating a distance to an object on a space on the basis of a plurality of photographed images obtained through photographing in positions different from one another by the photographing portion in a state in which the photographing portion is rotated.

(2)

The measurement apparatus according to (1), in which the distance calculating portion calculates the distance to the object on the basis of a geometric relationship among corresponding points in the plurality of photographed images.

(3)

The measurement apparatus according to (2), in which the distance calculating portion extracts line images constituted by pixel lines containing the corresponding points from the photographed images, and calculates the distance to the object on the basis of a synthetic image which is obtained by arranging side by side and synthesizing the plurality of line images obtained from the plurality of photographed images.

(4)

The measurement apparatus according to (3), in which the distance calculating portion calculates the distance to the object on the basis of amplitude of a locus of the corresponding points in the synthetic image.

(5)

The measurement apparatus according to any one of (1) to (4), further including a rectification portion rectifying the photographed images, in which the distance calculating portion calculates the distance to the object on the basis of a rectified image(s) obtained by the rectification.

(6)

The measurement apparatus according to any one of (1) to (5), in which the rotation control portion controls the rotation of the photographing portion provided in an upper portion of a vehicle.

(7)

The measurement apparatus according to any one of (1) to (6), in which the photographing portion is constituted by a two-dimensional image sensor.

(8)

The measurement apparatus according to any one of (1) to (6), in which the photographing portion is constituted by a line sensor.

(9)

The measurement apparatus according to any one of (1) to (8), in which the rotation control portion controls the rotation of the photographing portion in such a way that the photographing portion makes one rotation at a constant speed.

(10)

A measurement method, including the steps of:

controlling rotation of a photographing portion by a rotation mechanism in such a way that the photographing portion is rotated with a center of rotation as an axis in a state in which a distance from the center of rotation of the rotation mechanism to a focal point position of the photographing portion is a constant distance; and calculating a distance to an object on a space on the basis of a plurality of photographed images obtained through photographing in positions different from one another by the photographing portion in a state in which the photographing portion is rotated.

(11)

A program in accordance with which a computer executes processing including the steps of:

controlling rotation of a photographing portion by a rotation mechanism in such a way that the photographing portion is rotated with a center of rotation as an axis in a state in which a distance from the center of rotation of the rotation mechanism to a focal point position of the photographing portion is a constant distance; and calculating a distance to an object on a space on the basis of a plurality of photographed images obtained through photographing in positions different from one another by the photographing portion in a state in which the photographing portion is rotated.

REFERENCE SIGNS LIST

11 . . . Vehicle, 12 . . . Photographing portion, 71 . . . Three-dimensional measurement apparatus, 82 . . . Image storing portion, 83 . . . Image processing portion, 84 . . . Rotation control portion, 85 . . . Rotation mechanism portion, 91 . . . Position posture specifying portion, 92 . . . Rectification portion, 93 . . . Distance calculating portion

The invention claimed is:

1. A measurement apparatus, comprising:

a rotation control portion controlling rotation of a photographing portion by a rotation mechanism in such a way that the photographing portion is rotated with a center of rotation as an axis in a state in which a distance from the center of rotation of the rotation mechanism to a focal point position of the photographing portion is a constant distance; and a distance calculating portion calculating a distance to an object on a space on the basis of a plurality of photographed images obtained through photographing in positions different from one another by the photographing portion in a state in which the photographing portion is rotated, wherein the distance calculating portion extracts line images constituted by pixel lines containing corresponding points from the photographed images, and calculates the distance to the object on the basis of a synthetic image which is obtained by arranging side by side and synthesizing the plurality of line images obtained from the plurality of photographed images.

2. The measurement apparatus according to claim 1, wherein the distance calculating portion calculates the distance to the object on the basis of a geometric relationship among corresponding points in the plurality of photographed images.

3. The measurement apparatus according to claim 1, wherein the distance calculating portion calculates the distance to the object on the basis of amplitude of a locus of the corresponding point in the synthetic image.

4. The measurement apparatus according to claim 1, further comprising a rectification portion rectifying the photographed images, wherein the distance calculating portion calculates the distance to the object on the basis of a rectified image obtained by the rectification.

5. The measurement apparatus according to claim 1, wherein the rotation control portion controls the rotation of the photographing portion provided in an upper portion of a vehicle.

6. The measurement apparatus according to claim 1, wherein the photographing portion is constituted by a two-dimensional image sensor.

7. The measurement apparatus according to claim 1, wherein the photographing portion is constituted by a line sensor.

8. The measurement apparatus according to claim 1, wherein the rotation control portion controls the rotation of the photographing portion in such a way that the photographing portion makes one rotation at a constant speed.

9. A measurement method, comprising:

controlling rotation of a photographing portion by a rotation mechanism in such a way that the photographing portion is rotated with a center of rotation as an axis in a state in which a distance from the center of rotation of the rotation mechanism to a focal point position of the photographing portion is a constant distance; and calculating a distance to an object on a space on the basis of a plurality of photographed images obtained through photographing in positions different from one another by the photographing portion in a state in which the photographing portion is rotated, wherein line images constituted by pixel lines containing corresponding points are extracted from the photographed images, and the distance to the object is calculated on the basis of a synthetic image which is obtained by arranging side by side and synthesizing the plurality of line images obtained from the plurality of photographed images.

10. A non-transitory, computer-readable medium containing instructions that, when executed by a processing device, perform a measurement method comprising:

controlling rotation of a photographing portion by a rotation mechanism in such a way that the photographing portion is rotated with a center of rotation as an axis in a state in which a distance from the center of rotation of the rotation mechanism to a focal point position of the photographing portion is a constant distance; and calculating a distance to an object on a space on the basis of a plurality of photographed images obtained through photographing in positions different from one another by the photographing portion in a state in which the photographing portion is rotated, wherein line images constituted by pixel lines containing corresponding points are extracted from the photographed images, and the distance to the object is calculated on the basis of a synthetic image which is obtained by arranging side by side and synthesizing the plurality of line images obtained from the plurality of photographed images.

* * * * *